United States Patent
Frohlich et al.

(10) Patent No.: US 9,800,352 B2
(45) Date of Patent: Oct. 24, 2017

(54) QUANTUM COMMUNICATION SYSTEM AND A QUANTUM COMMUNICATION METHOD

(71) Applicant: Kabushiki Kaisha Toshiba, Minato-ku (JP)

(72) Inventors: Bernd Matthias Frohlich, Cambridge (GB); James Dynes, Cambridge (GB); Zhiliang Yuan, Cambridge (GB); Andrew James Shields, Cambridge (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 113 days.

(21) Appl. No.: 14/798,838

(22) Filed: Jul. 14, 2015

(65) Prior Publication Data

US 2016/0233964 A1    Aug. 11, 2016

(30) Foreign Application Priority Data

Feb. 5, 2015  (GB) .................................. 1501946.6

(51) Int. Cl.
*H04B 10/00* (2013.01)
*H04B 10/85* (2013.01)
*H04B 10/70* (2013.01)
*H04B 10/2581* (2013.01)

(52) U.S. Cl.
CPC ......... *H04B 10/85* (2013.01); *H04B 10/2581* (2013.01); *H04B 10/70* (2013.01)

(58) Field of Classification Search
None
See application file for complete search history.

(56) References Cited

U.S. PATENT DOCUMENTS

| | | | | |
|---|---|---|---|---|
| 7,639,947 | B2 * | 12/2009 | Luo | H04B 10/70 380/256 |
| 9,344,779 | B2 * | 5/2016 | Sethumadhavan | H04J 14/04 |
| 9,608,762 | B2 * | 3/2017 | Zhou | H04J 14/04 |
| 2007/0076884 | A1 * | 4/2007 | Wellbrock | H04L 9/0858 380/263 |
| 2007/0133798 | A1 | 6/2007 | Elliot | |

(Continued)

FOREIGN PATENT DOCUMENTS

| | | |
|---|---|---|
| CN | 103118308 A | 5/2013 |
| CN | 103929251 A | 7/2014 |

(Continued)

OTHER PUBLICATIONS

Combined Search and Examination Report issued Jul. 6, 2015 in United Kingdom Patent Application No. GB1501946.6.

(Continued)

*Primary Examiner* — Tesfaldet Bocure
(74) *Attorney, Agent, or Firm* — Oblon, McClelland, Maier & Neustadt, L.L.P.

(57) ABSTRACT

A quantum communication system, comprising: a quantum transmitter optically coupled to a first waveguide; a first communication device optically coupled to a second waveguide; a multi-core optical fiber comprising a first core and a second core; a spatial multiplexing unit, configured to optically couple the first waveguide to the first core and the second waveguide to the second core.

20 Claims, 12 Drawing Sheets

(56) References Cited

U.S. PATENT DOCUMENTS

| | | | | |
|---|---|---|---|---|
| 2012/0177365 A1* | 7/2012 | Winzer | ............. | H04B 10/2581 398/26 |
| 2014/0186033 A1* | 7/2014 | Winzer | ............. | H04B 10/2581 398/39 |
| 2014/0199065 A1* | 7/2014 | Bratkovski | ........ | H04B 10/2581 398/44 |

FOREIGN PATENT DOCUMENTS

| | | | | | |
|---|---|---|---|---|---|
| GB | 2492083 | A | | 12/2012 | |
| GB | 2514134 | | | 11/2014 | |
| GB | 2534917 | A | * | 8/2016 | ........... H04L 9/0852 |
| GB | 2534918 | A | * | 8/2016 | ............. H04B 10/85 |
| JP | 2006-101491 | A | | 4/2006 | |
| JP | 2009-509367 | A | | 3/2009 | |
| JP | 2009-194833 | A | | 8/2009 | |
| JP | 2009-543393 | A | | 12/2009 | |
| JP | 2010-520447 | A | | 6/2010 | |
| JP | 2011-146787 | A | | 7/2011 | |
| JP | 2013-13073 | A | | 1/2013 | |
| JP | 2013-197859 | A | | 9/2013 | |
| JP | 5572748 | B1 | | 8/2014 | |
| WO | WO 2007/033561 | A1 | | 3/2007 | |
| WO | WO 2007/041178 | A2 | | 4/2007 | |

OTHER PUBLICATIONS

Yutaka Miyamoto, et al., "High-density spatial multiplexing optical communication technology aiming at realizing petabit class transmission per second" NTT Technical Journal [Online], retrieved from the internet: URL: http://www.ntt.co.jp/journal/1408/files/jn201408052.pdf, vol. 26, No. 8, Aug. 2014, pp. 1-10 (reference previously filed, submitting unedited computer generated English translation only).

Office Action dated Jan. 13, 2017 in Japanese Patent Application No. 2015-232272 (submitting English language translation only).

Miyamoto, et al., "High-density spatial multiplexing photonic technology and NTT technical journal" [on-line] and Japan, Nippon Telegraph and Telephone Corporation, vol. 26, No. 8, Aug. 2014, pp. 52-56, and [Heisei 29 Jan. 12, 2017 search]—[which aimed at realization of PetaBit class transmission per second besides Yutaka ] The Internet, URL, http://www.ntt.co.jp/journal/1408/files/jn201408052.pdf.

Patents Act 1977, Examination Report under Section 18(3), dated Jul. 18, 2017 in United Kingdom Patent Application No. GB1501946.6 (2 pages).

* cited by examiner ered single
QUANTUM COMMUNICATION SYSTEM AND A QUANTUM COMMUNICATION METHOD

FIELD

Embodiments described herein relate generally to quantum communication systems and quantum communication methods.

BACKGROUND

In a quantum communication system, information is sent between a transmitter and a receiver by encoded single quanta, such as single photons. Each photon carries one bit of information encoded upon a property of the photon, such as its polarization, phase or energy/time. The photon may even carry more than one bit of information, for example, by using properties such as angular momentum.

Quantum key distribution (QKD) is a technique which results in the sharing of cryptographic keys between two parties: a transmitter often referred to as "Alice"; and a receiver often referred to as "Bob". The attraction of this technique is that it provides a test of whether any part of the key can be known to an unauthorised eavesdropper, often referred to as "Eve". In many forms of quantum key distribution, Alice and Bob use two or more non-orthogonal bases in which to encode the bit values. The laws of quantum mechanics dictate that measurement of the photons by Eve without prior knowledge of the encoding basis of each causes an unavoidable change to the state of some of the photons. These changes to the states of the photons will cause errors in the bit values sent between Alice and Bob. By comparing a part of their common bit string, Alice and Bob can thus determine if Eve has gained information.

BRIEF DESCRIPTION OF THE FIGURES

Devices and methods in accordance with non-limiting embodiments will now be described with reference to the accompanying figures in which.

DETAILED DESCRIPTION

Figure 1A:
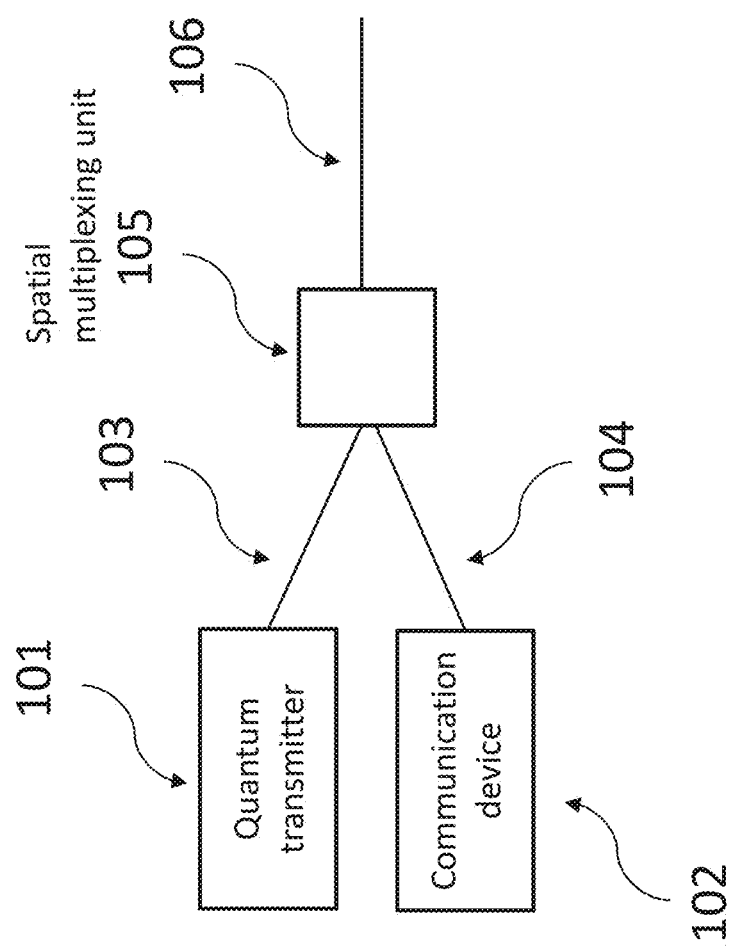
FIG. 1A shows a schematic illustration of a quantum communication system in accordance with an embodiment, comprising a quantum transmitter.

According to one embodiment, there is provided a quantum communication system, comprising:

a quantum transmitter optically coupled to a first waveguide;

a first communication device, optically coupled to a second waveguide;

a multi-core optical fibre comprising a first core and a second core;

a spatial multiplexing unit, configured to optically couple the first waveguide to the first core and the second waveguide to the second core.

In one embodiment, the first communication device is a classical communication device. The classical communication device may be a classical transmitter, a classical receiver or a classical transceiver module.

In one embodiment, the system further comprises:

one or more further classical communication devices, each optically coupled to a further waveguide;

wherein the multi-core optical fibre comprises one or more further cores and wherein the spatial multiplexing unit is further configured to optically couple each waveguide to a different core in the multi-core optical fibre.

In one embodiment, the first communication device is a quantum communication device. The quantum communication device may be a quantum transmitter or a quantum receiver.

In one embodiment, the system further comprises:

one or more further quantum communication devices, each optically coupled to a further waveguide;

wherein the multi-core optical fibre comprises one or more further cores and wherein the spatial multiplexing unit is further configured to optically couple each waveguide to a different core in the multi-core optical fibre.

In one embodiment, the quantum transmitter and the first communication device are integrated onto a photonic chip and no optical fibres are used. In one embodiment, free-space micro-optics are used instead of optical fibres.

The spatial multiplexing unit is configured to multiplex a signal from the first waveguide and a signal from the second waveguide into the multi-core optical fibre.

The first and second waveguides may be single mode optical fibres.

The quantum transmitter comprises a source of quantum signals. In one embodiment, the source of quantum signals is a pulsed laser and an optical attenuator. The average number of photons in a pulse may be less than 1. Information may be encoded onto the light pulses by changing a quantum parameter of the photons such as polarisation or phase. The quantum transmitter may also comprise an intensity modulator configured to realise a decoy-state QKD protocol.

In one embodiment, the multi-core optical fibre comprises two cores. In one embodiment, the multi-core optical fibre comprises four cores. In one embodiment, the multi-core optical fibre comprises seven cores. In one embodiment, the multi-core optical fibre has seven or more cores. In one embodiment, the multi-core optical fibre comprises a plurality of optical cores surrounded by a shared cladding.

In one embodiment, the spatial multiplexing unit comprises a fibre fan-out.

The fibre fan-out may comprise a fibre bundle comprising a plurality of optical fibres, wherein the outer diameter of the cladding at a first end of each optical fibre in the fibre bundle is less than or equal to the smallest distance between the cores in the multi-core optical fibre, and wherein a first optical fibre in the fibre bundle is optically coupled at the first end to the first core in the multi-core optical fibre and at the other end to the first waveguide, and wherein a second optical fibre in the fibre bundle is optically coupled at the first end to the second core in the multi-core optical fibre and at the other end to the second waveguide.

Alternatively, the fibre fan-out may comprise a photonic chip, comprising a plurality of waveguides, wherein the spacing between the waveguides on the photonic chip at a first end is substantially equal to the distance between the cores in the multi-core optical fibre, and wherein a first waveguide on the photonic chip is optically coupled at the first end to the first core in the multi-core optical fibre and at the other end to the first waveguide, and wherein a second waveguide on the photonic chip is optically coupled at the first end to the second core in the multi-core optical fibre and at the other end to the second waveguide.

In one embodiment, at least one of the first core or the second core is configured to transmit a plurality of signals using wavelength division multiplexing. In one embodiment, the system further comprises a wavelength division multiplexer. The multi-core fibre is connected to the spatial multiplexing unit. The spatial multiplexing unit is configured to optically couple the first core in the multi-core fibre to a first optical fibre and the second core in the multi-core fibre to a second optical fibre. The first fibre is connected to a wavelength division multiplexer, which is configured to direct light of a first wavelength to the first waveguide and light of a second wavelength to a third waveguide.

In one embodiment, at least one of the first core or the second core is a multi-mode waveguide. The system may further comprise a spatial mode de-multiplexer. The spatial multiplexing unit is configured to optically couple at least one of the first core in the multi-core fibre or the second core in the multi-core fibre to a multi-mode fibre. The multi-mode fibre is connected to the spatial mode de-multiplexer. The spatial mode de-multiplexer is configured to optically couple a first spatial mode in the multi-mode fibre to the first waveguide. A second spatial mode in the first spatial mode fibre may be optically coupled to a third waveguide.

In one embodiment, the quantum communication system further comprises: a quantum receiver, comprising at least one detector configured to detect quantum signals, and optically coupled to a fourth waveguide; a second communication device optically coupled to a fifth waveguide; and a second spatial multiplexing unit, configured to optically couple the fourth waveguide to the first spatial channel in the multi-core optical fibre and the fifth waveguide to the second spatial channel in the multi-core optical fibre.

In one embodiment, the quantum transmitter components and communication device components are integrated onto a first photonic chip. In one embodiment, the quantum receiver components and communication device components are integrated onto second photonic chip.

In one embodiment, the quantum transmitter components and communication device components are optically coupled using free-space micro-optics. In one embodiment, the quantum receiver components and communication device components are coupled using free-space micro-optics.

The light is coupled into an optical fibre only at the output of the transmitter and receiver.

In one embodiment, the quantum communication system comprises a plurality of quantum transmitters and a quantum receiver, wherein the plurality of transmitters are optically coupled to the receiver through a multi-core splitter.

In one embodiment, the quantum communication system further comprises a timing control module, configured to synchronise the quantum transmitter and quantum receiver, wherein the second communication device is configured to receive a synchronisation signal from the timing control module and send the synchronisation signal to the first communication device through the second spatial channel. In another embodiment, the first communication device is configured to receive a synchronisation signal from the timing control module and send the synchronisation signal to the second communication device through the second spatial channel. In another embodiment, synchronisation is realised by generating a system clock at the quantum transmitter from data sent over a classical channel. In another embodiment, synchronisation is realised by generating a system clock at the quantum receiver from data sent over a classical channel.

In one embodiment, the at least one detector is a gated detector and the timing control module is configured to synchronise the gating of the detector with the arrival time of signals from the quantum transmitter. In one embodiment, the timing control module is configured to synchronise the phase modulators.

In one embodiment, the quantum receiver comprises a decoder and the quantum transmitter comprises an encoder, configured to generate an encryption key between the quantum receiver and the quantum transmitter.

In one embodiment, the quantum communication system comprises a module configured to encrypt classical data using the generated encryption key and a module configured to decrypt classical encrypted data using the generated encryption key, and wherein the first communication device and second communication device are configured to exchange encrypted classical data.

In one embodiment, the quantum communication system is a QKD system. In one embodiment, the module configured to encrypt classical data and the module configured to decrypt classical data each comprises asymmetrical Mach-Zehnder interferometer. In one embodiment, the module configured to encrypt classical data and the module configured to decrypt classical data each further comprises a phase modulator.

In one embodiment, the quantum communication system further comprises a feedback control unit configured to realise active stabilisation based on a feedback signal, wherein the second communication device is configured to transmit the feedback signal to the first communication device, the quantum transmitter comprising a control element configured to be controlled by the feedback signal.

In one embodiment, active stabilisation is realised by a control unit in the quantum receiver which controls a component or components of the quantum receiver based on the stabilisation pulse counts, for example, and no feedback signal is transmitted.

In one embodiment, the active stabilisation is based on the quantum bit error ratio. In one embodiment, the active stabilisation is based on detection results of reference pulses sent from the quantum transmitter to the quantum receiver. In one embodiment, the control element is a tuneable phase delay in the asymmetrical Mach-Zehnder interferometer, or the phase modulator, at the receiver or transmitter.

In one embodiment, the active stabilisation is based on the count rate of interfering photons. In one embodiment, the control element is a polarisation controller at the receiver or transmitter.

In one embodiment, the control element is the delay, or time control, or trigger of the photon source. In one embodiment, the control element is the gating control of the photon detector.

In one embodiment, the quantum transmitter is configured to emit pulses of photons, wherein the average number of photons in a pulse is less than 1.

According to another embodiment, there is provided a quantum communication system, comprising:
  a receiver, comprising at least one detector configured to detect quantum signals, and optically coupled to a first waveguide;
  a second communication device optically coupled to a second waveguide;
  a multi-core optical fibre comprising a plurality of spatial channels;
  a spatial multiplexing unit, configured to optically couple the first waveguide to a first spatial channel in the multi-core optical fibre and the second waveguide to a second spatial channel in the multi-core optical fibre.

The at least one detector may be a single photon detector, which can be either gated or free-running. The single photon detector can be based on a semiconductor InGaAs avalanche photodiode for example.

In one embodiment, the quantum receiver and the second communication device are integrated onto a photonic chip and no optical fibres are used. In one embodiment, free-space micro-optics are used instead of optical fibres.

According to another embodiment, there is provided a quantum communication method for communicating over a system comprising a quantum transmitter, a first communication device, a first spatial multiplexing unit, a multi-core optical fibre comprising a plurality of spatial channels, a second spatial multiplexing unit, a quantum receiver and a second communication device, the method comprising the steps of:
  sending quantum signals from the quantum transmitter to the first spatial multiplexing unit;
  directing the quantum signals into a first spatial channel in the multi-core optical fibre;
  receiving the quantum signals from the first spatial channel at the second spatial multiplexing unit;
  directing the quantum signals to the quantum receiver;
  sending signals from one of the first communication device or the second communication device to one of the first spatial multiplexing unit or the second spatial multiplexing unit;
  directing the signals into a second spatial channel in the multi-core optical fibre;
  receiving the signals from the second spatial channel at the other one of the first spatial multiplexing unit or the second spatial multiplexing unit;
  directing the signals to the other one of the first communication device or the second communication device.

FIG. 1A is a schematic illustration of a quantum communication system in accordance with an embodiment. The communication system comprises a quantum transmitter 101 and a communication device 102. The quantum transmitter 101 is optically coupled to a first waveguide 103 and the communication device 102 is optically coupled to a second waveguide 104. The first waveguide 103 and the second waveguide 104 are optically coupled to a spatial multiplexing unit 105. A third waveguide 106 is also optically coupled to the spatial multiplexing unit 105. The third waveguide 106 is configured to allow transmission of different signals along different spatial channels. The third waveguide 105 comprises a plurality of spatial channels. The third waveguide 106 may be a length of fibre supporting transmission of several spatial modes. The spatial multiplexing unit 105 is configured to optically couple the first waveguide 103 to a first spatial channel in the third waveguide 106 and the second waveguide 104 to a second spatial channel in the third waveguide 106.

The quantum transmitter 101 comprises a source of quantum signals, for example, a pulsed laser and an optical attenuator. The quantum transmitter 101 may be configured to emit pulses of photons, wherein the average number of photons in a pulse is less than 1. Information may be encoded onto the light pulses by changing a quantum parameter of the photons such as polarisation or phase.

The quantum transmitter 101 transmits a quantum signal into optical waveguide 103. The signal is inputted into the spatial multiplexing unit 105. The spatial multiplexing unit 105 directs the signal into the fibre link 106, in a first spatial channel.

The spatial multiplexing unit 105 may attenuate the signals travelling through the unit by 0.5 to 2 dB or more.

In one embodiment, the communication device 211 is a classical communication device. The system is a combined quantum and classical communication system. Quantum transmitter 101 and classical communication device 102 are connected via waveguides 103 and 104 to spatial multiplexing unit 105. In one embodiment, the waveguides may be single-mode optical fibres. The spatial multiplexing unit 105 multiplexes signals onto fibre 106, which supports transmission of multiple spatial modes. In other words, spatial mode multiplexing is used to transmit both quantum and classical signals. Fibre 106 can be a multi-core fibre, for example.

The quantum signals from the quantum transmitter 101 and the classical signals to or from the classical communication device are transmitted along the same optical fibre link, along separate spatial channels. The separate spatial channels may be separate cores in a multi-core fibre. When the quantum signal and classical signal are transmitted in separate spatial channels, cross-talk between the classical signals and quantum signals is low, even though they are transmitted along the same fibre link. In an embodiment, narrow wavelength filters and time-filtering detectors are not used to suppress cross-talk between the classical signals and the quantum signals. In an alternative embodiment, additional filters, such as wavelength or polarisation filters are used.

A system in which the quantum signal and the classical signal travel along a single fibre link is low cost, and can be integrated into existing networks. Furthermore, as cross-talk between the classical and quantum signals is low, a high data transmission rate can be used for the classical transmission.

In one embodiment, the classical communication device 102 is a classical receiver. In one embodiment, classical communication device 102 is a source of classical signals.

In one embodiment, the quantum communication system uses bi-directional classical communication. Bi-directional classical communication can be used for synchronisation, feedback, error correction and privacy amplification in a QKD system for example. The bi-directional classical communication can further be used for additional classical communication such as Ethernet for example. In this embodiment, classical communication device 102 is a bi-directional communication device. Bi-directional communication may be performed on the waveguide 104 using wavelength division multiplexing (WDM). A bi-directional classical communication device is a transceiver, i.e. a receiver and transmitter in a compact module. The transceiver is optically coupled to waveguide 104. It may transmit classical signals at a first wavelength into the waveguide 104 and receive signals travelling along waveguide 104 at a second wavelength. A transceiver is distinct from a system having several separated receivers/transmitter such as shown in FIG. 5b, where each quantum receiver and quantum transmitter is optically coupled to a separate waveguide. The quantum transmitters/receivers in a system such as FIG. 5b could be at different physical locations.

Where the classical communication device 102 comprises a source of classical signals, it transmits a classical signal into optical waveguide 104. The signal is inputted into the spatial multiplexing unit 105. The spatial multiplexing unit 105 directs the signal into the fibre link 106, in a second spatial channel.

Where the classical communication device 102 comprises a classical receiver, a classical signal transmitted along a second spatial channel in the fibre link 106 is directed by the spatial multiplexing unit 105 into optical waveguide 104. The signal is received by the classical receiver 102.

It is desirable for quantum channels to share the same physical transmission medium with classical channels in a quantum communication system, e.g. to share a single optical fibre. In QKD techniques, Alice and Bob communicate using classical signals in addition to quantum signals. Classical and quantum channels may be transmitted together along a single optical fibre using wavelength division multiplexing, whereby different wavelengths of light are used to transmit the different signals.

When quantum and classical channels are multiplexed together in this way, Raman scattering of photons is generated by the high power classical lasers used to transmit the classical signals. This inelastic scattering of photons leads to noise in the quantum wavelength band which cannot be filtered with wavelength filters. In order to minimize this noise, the power of the classical signals may be restricted, for example.

In an alternative embodiment, the communication device 102 is a quantum communication device. The quantum communication device may be a quantum transmitter or a quantum receiver. In this embodiment, the bandwidth of the system is increased, because the second core in the multi-core fibre 106 allows spatial multiplexing of quantum communication signals.

Quantum transmitter 101 and quantum communication device 102 are connected via waveguides 103 and 104 to spatial multiplexing unit 105. In one embodiment, the waveguides may be single-mode optical fibres. The spatial multiplexing unit 105 multiplexes signals onto fibre 106, which supports transmission of multiple spatial modes. In other words, spatial mode multiplexing is used to transmit quantum signals for both quantum transmitter 101 and quantum communication device 102. Fibre 106 can be a multi-core fibre, for example.

The quantum signals from the quantum transmitter 101 and the quantum signals to or from the quantum communication device 102 are transmitted along the same optical fibre link, along separate spatial channels. The separate spatial channels may be separate cores in a multi-core fibre.

Figure 1B:
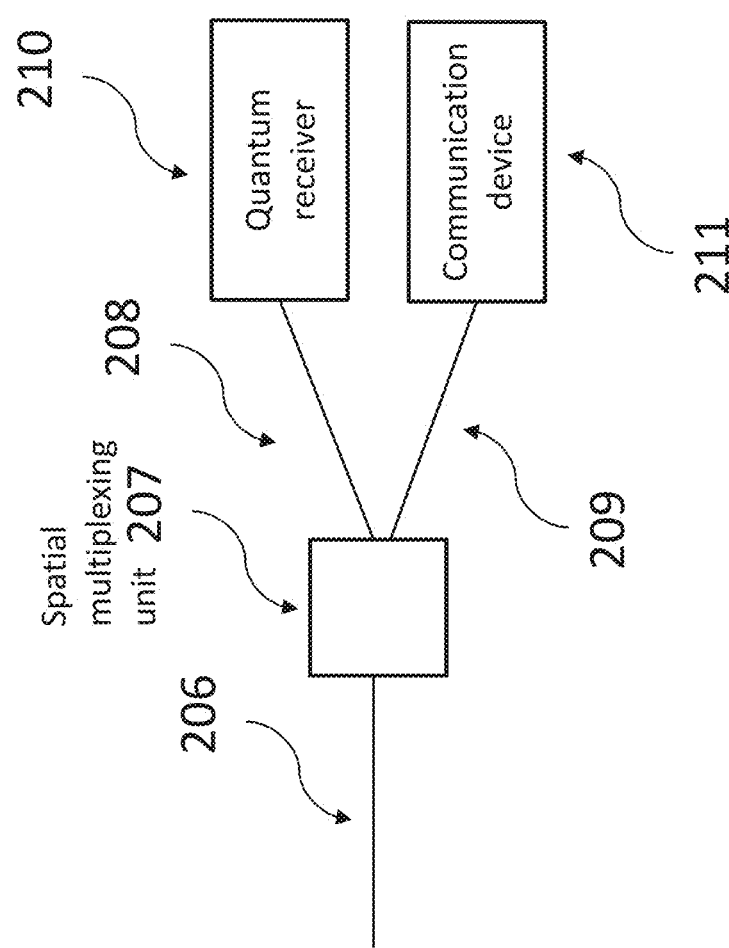
FIG. 1B shows a schematic illustration of a quantum communication system in accordance with an embodiment, comprising a quantum receiver.

FIG. 1B is a schematic illustration of a quantum communication system in accordance with an embodiment. The communication system comprises a quantum receiver 210 and a communication device 211. The quantum receiver 210 is optically coupled to a first waveguide 208 and the communication device 211 is optically coupled to a second waveguide 209. The first waveguide 208 and the second waveguide 209 are optically coupled to a spatial multiplexing unit 207. A third waveguide 206 is also optically coupled to the spatial multiplexing unit 207. The third waveguide 206 is configured to allow transmission of different signals along different spatial channels. The third waveguide 206 comprises a plurality of spatial channels. The spatial multiplexing unit 207 is configured to optically couple the first waveguide 208 to a first spatial channel in the third waveguide 206 and the second waveguide 209 to a second spatial channel in the third waveguide 206. Fibre 206 can be a multi-core fibre, for example.

The quantum receiver comprises one or more detectors, for example single photon detectors. The single photon detectors can be either gated or free-running. The single photon detectors can be based on semiconductor InGaAs avalanche photodiodes for example.

A quantum signal is transmitted along a first spatial channel in the fibre link 206, and is directed by the spatial multiplexing unit 207 into optical waveguide 208. The signal is received by the quantum receiver 210.

In one embodiment, the communication device is a classical communication device. In one embodiment, the classical communication device 211 is a classical receiver. In one embodiment, classical communication device 211 is a source of classical signals. In one embodiment, the classical communication device is configured to both transmit and receive classical signals, as described above.

Where the classical communication device 211 comprises a source of classical signals, it transmits a classical signal into optical waveguide 209. The signal is inputted into the spatial multiplexing unit 207. The spatial multiplexing unit 207 directs the signal into the fibre link 206, in a second spatial channel.

Where the classical communication device 211 comprises a classical receiver, a classical signal transmitted along a second spatial channel in the fibre link 206 is directed by the spatial multiplexing unit 207 into optical waveguide 209. The signal is received by the classical receiver.

In an alternative embodiment, the communication device 211 is a quantum communication device. The quantum communication device may be a quantum transmitter or a quantum receiver. In this embodiment, the bandwidth of the system is increased, because the second core in the multi-core fibre 206 allows spatial multiplexing of quantum communication signals.

Figure 2:
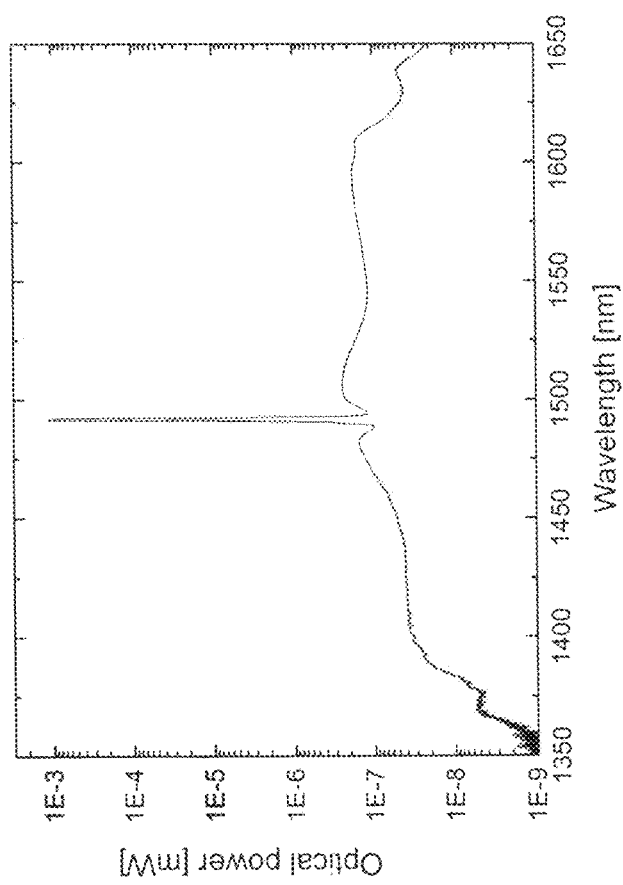
FIG. 2 shows a Raman scattering spectrum of a classical signal transmitted at 1490 nm.

FIG. 2 shows a Raman scattering spectrum of a classical signal transmitted at 1490 nm. Wavelength is shown on the horizontal axis in nm, with optical power in mW on the vertical axis. The spectrum shows the light scattered in backward direction. The strong peak at 1490 nm corresponds to Rayleigh scattering of the classical signal. The classical signal also has a broad background, as a result of Raman scattering. This broad background can affect wavelength division multiplexed signals transmitted along the same fibre. The Raman noise may be at the same wavelength as the wavelength division multiplexed signal.

Figure 3:
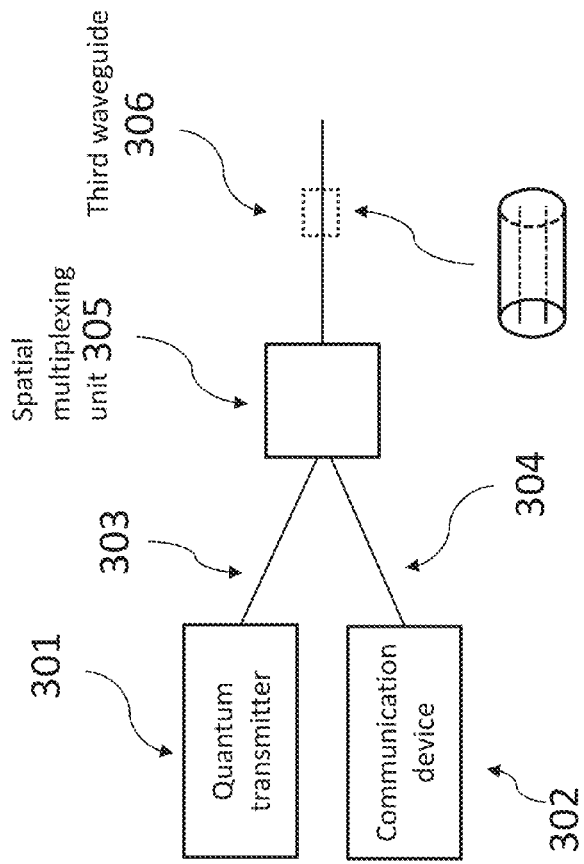
FIG. 3A shows a schematic illustration of a quantum communication system in accordance with an embodiment, comprising a multi-core optical fibre.
FIG. 3B shows a microscope image of an end of a multi-core fibre and a microscope image of an end of a single-core fibre.
Figure 3:
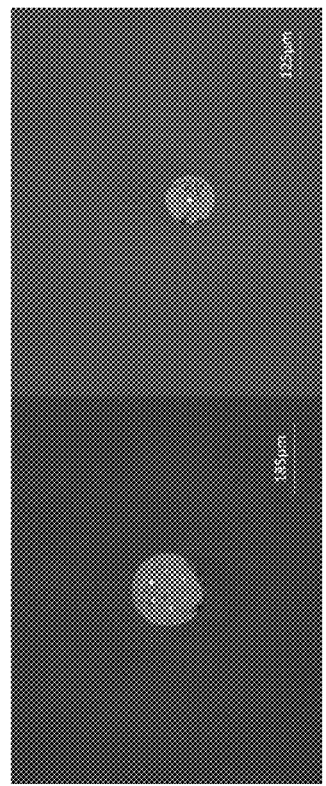

FIG. 3A is a schematic illustration of a quantum communication system in accordance with an embodiment, in which the waveguide 306 is a multi-core optical fibre. The system comprises a quantum transmitter 301 and a communication device 302. The quantum transmitter 301 is optically coupled to a first waveguide 303 and the communication device 302 is optically coupled to a second waveguide 304. The first waveguide 303 and the second waveguide 304 are optically coupled to a spatial multiplexing unit 305, which is a fibre fan-out. A third waveguide 306, which is a multi-core optical fibre is also optically coupled to the fibre fan-out 305.

The multi-core optical fibre 306 permits transmission of one spatial mode per core. Fibre fan-out 305 directs signals transmitted from a first core of the multi-core fibre 306 into the single-mode waveguide 303 and from a second core into a single-mode waveguide 304. For transmissions in the other direction, fibre fan-out 305 directs signals transmitted from the single-mode waveguide 303 into the first core and signals transmitted from the second single-mode waveguide 304 into the second core. The fibre fan-out 305 connects several single-mode fibres to a multi-core fibre, in order to launch signals into the different cores. Each core in the multi-core fibre is optically coupled to a waveguide through the fibre fan-out 305.

The multi-core waveguide may have a diameter which is only marginally larger than a single core optical fibre.

In one embodiment, the fibre fan-out 305 comprises a fibre bundle, wherein the outer diameter of the cladding of each fibre in the fibre bundle is less than or equal to the smallest distance between the cores in the multi-core fibre 306. Each fibre in the fibre bundle is optically coupled to a core in the multi-core fibre 306. The fibre bundle comprises single-mode fibres which have cladding with a reduced diameter compared to a standard single mode fibre. The single-mode fibres with reduced diameter cladding are packed closely together in the fibre-fan-out 305, and each single-mode fibre is connected to a core in the multi-core fibre 306. The distance between the cores in the single-mode fibres is equal to the distance between the cores in the multi-core fibre 306, because the reduced amount of cladding in the single-mode fibres allows them to pack closely together. After they have been packed together, for example with glue, the end face of the packed bundle of single mode fibres is polished and is connected to the multi-core fibre 306. The cores of the fibre bundle and the multi-core fibre 306 have to be aligned, e.g. by measuring the transmission loss of the different cores. A first optical fibre in the fibre bundle may be optically coupled at the other end to waveguide 303 and a second optical fibre in the fibre bundle may be optically coupled at the other end to waveguide 304.

In another embodiment, the fibre fan-out 305 comprises a photonic chip, comprising 3D waveguides. The chip is formed of a suitable material, into which the 3D waveguides are inscribed with a laser. By adjusting the focus depth of the inscribing laser, 3D waveguides can be formed. The waveguides may be arranged such that they do not lie in a plane. The z component can be changed along the length of the waveguide. Several waveguides can lie on top of each other in the chip. At one end of the photonic chip the 3D waveguides are spaced out evenly and connected to a V-groove array of single-mode fibres, for example waveguide 303, waveguide 304 etc. At the other end, the 3D waveguides are close together, such that the spacing matches the core configuration of the multi-core fibre 306. The multi-core fibre 306 is then connected to this side of the chip.

FIG. 3B shows a microscope image of an end of a multi-core fibre (left) and a microscope image of an end of a single-core fibre (right), for comparison. The multi-core fibre shown comprises seven cores, however in general, multi-core fibres may comprise more or less than seven cores. Each core is a transparent waveguide. The cores are surrounded by shared cladding. The cores run lengthwise along the multi-core fibre. In the multi-core fibre shown, six cores are arranged in a ring, with the seventh core being in the middle of the ring.

The diameter of the multi-core fibre shown is 185 µm. The diameter of the single core fibre shown is 125 µm. In one embodiment, the multi-core fibre is between 125 µm and 225 µm in diameter.

The difference between a multi-core fibre and an optical cable made of multiple fibres is the shared cladding. The cladding is the material that surrounds the core which has a lower refractive index than the core, in order to confine the optical mode(s). The multiple cores in a multi-core fibre are all encased in a single shared cladding. In a multi-fibre optical cable, each fibre is encased in a separate, individual cladding. Each fibre is thus a fully functional waveguide in itself and can be separated from the other fibres.

Using a multi-core fibre allows transmission over long distances because the modes of the different cores do not couple strongly. A fibre-fan out reliably couples between the multi-core optical fibre and the waveguides, with only a low amount of cross-talk between the modes in the different cores. In one embodiment, the multicore fibre is configured such that transmission can occur over a distance of at least 50 km. In one embodiment, the multicore fibre is configured such that transmission can occur over a distance of at least 100 km. In one embodiment, the multicore fibre is configured such that transmission can occur over a distance of at least 200 km.

In one embodiment, the cores in the multi-core fibre are configured such that optical signals propagate at the same speed in each core.

In an embodiment, narrow wavelength filters and time-filtering detectors are not used to suppress cross-talk between the classical signals and the quantum signals. In an embodiment, the quantum communication system comprises filtering components such as wavelength filters.

Figure 4A:
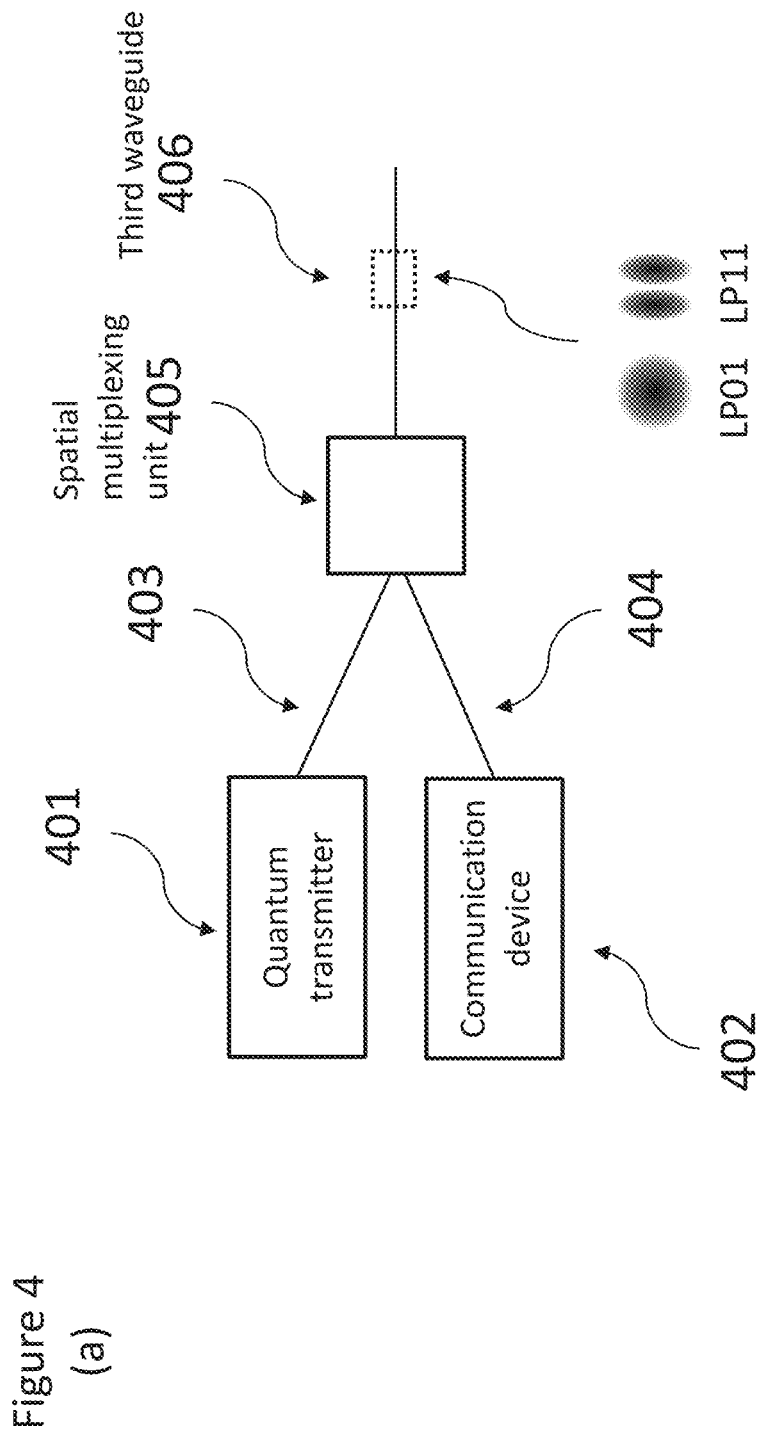
FIG. 4A shows a schematic illustration of a quantum communication system, comprising a few-mode or multi-mode optical fibre.

FIG. 4A is a schematic illustration of a quantum communication system, in which the waveguide 406 is a few-mode or multi-mode optical fibre. The system comprises a quantum transmitter 401 and a communication device 402. The quantum transmitter 401 is optically coupled to a first waveguide 403 and the communication device 402 is optically coupled to a second waveguide 404. The first waveguide 403 and the second waveguide 404 are optically coupled to a spatial multiplexing unit 405, which is a spatial mode de-multiplexer. A third waveguide 406, which is a few-mode or multi-mode optical fibre is also optically coupled to the spatial mode de-multiplexer 405.

The few-mode or multi-mode fibre 406 supports transmission of several spatial modes in the same waveguide. The figure shows an illustration of two of these modes, referred to as LP01 and LP11 (where LP stands for linearly polarized). LP modes are paraxial solutions (propagating approximately parallel to the fibre axis) of the wave equation in the optical fibre. Their electrical and magnetic field is approximately orthogonal to the fibre axis, hence they are approximately transverse electromagnetic (TEM). These solutions exist in the limit of a weakly guiding waveguide where the index of refraction difference between core and cladding is small.

Each mode has two orthogonal states of polarisation, as in a normal single-mode fibre (e.g. LP01 horizontal and LP01 vertical). The different LP modes have a different radial electric and magnetic field distribution as indicated in the figure. In other words, the modes travel along different spatial paths in the waveguide, although there may be some overlap. The modes are de-coupled, i.e. light from one mode is unlikely to couple into a different mode. Light in mode LP11 travels along a path further from the centre of the fibre than light in mode LP01. This allows mode LP01 or LP11 to be selectively excited by launching the light at a position central to the fibre core or offset to the fibre core, respectively.

Few-mode and multi-mode fibres are fibres with larger diameter cores which support transmission of more than one spatial mode. Few-mode fibres are only slightly larger than single-mode fibres and support only a few extra spatial modes. This allows transmission over much longer distances than with multi-mode fibres because the modes do not couple strongly. The few-mode fibre may be configured to transmit less than ten spatial modes. The few-mode fibre may be configured to transmit two spatial modes. The few-mode fibre may be configured to transmit four spatial modes. The few-mode fibre may be configured to transmit less than 50 modes. The diameter of the few mode fibre core depends on the specific fibre type, and such factors as the index of refraction of the core and cladding, and the wavelength. The diameter of a few-mode fibre core may be 10 to 50 µm. The diameter of a few-mode fibre core may be 10 to 20 µm.

Few-mode or multi-mode fibre 406 is connected to spatial mode de-multiplexer 405. A spatial mode de-multiplexer 406 separates signals transmitted in different spatial modes, and is also referred to as a photonic lantern. Spatial mode de-multiplexer 405 directs input signals from fibre 406 in mode LP01 into a first single-mode waveguide 403 and input signals from fibre 406 in mode LP11 into a second single-mode waveguide 404. For transmissions in the other direction, spatial mode de-multiplexer 405 directs signals transmitted from the single-mode waveguide 403 into the fibre 406 in mode LP01 and signals transmitted in the second single-mode waveguide 404 into fibre 406 in mode LP11. The spatial mode de-multiplexer 405 connects several single-mode fibres to a multi-mode fibre 406, in order to launch signals into the different spatial modes.

The spatial mode de-multiplexer 405 may comprise a fibre bundle, wherein the outer diameter of the cladding of each fibre in the fibre bundle is tapered at one end such that each fibre in the fibre bundle is optically coupled to a different spatial mode in the multi-mode fibre 406. The taper is used to guide the light of the different fibres into the core of the multi-mode fibre 406. The light from the different optical fibres in the bundle is launched into a single multi-mode core. In one embodiment, the multi-mode core is 10 um wide. Light exiting the tapered end of the fibre excites mainly one spatial mode. A first optical fibre in the fibre bundle may be optically coupled at the other end to waveguide 303 and a second optical fibre in the fibre bundle may be optically coupled at the other end to waveguide 304.

The spatial mode de-multiplexer 405 may comprise a photonic chip, comprising 3D waveguides. The chip is formed of a suitable material, into which the 3D waveguides are inscribed with a laser. At one end of the photonic chip the 3D waveguides are spaced out evenly and connected to a V-groove array of single-mode fibres, for example waveguide 303, waveguide 304 etc. At the other end, the 3D waveguides are close together, such that the light from the different optical fibres in the bundle is launched into a single multi-mode core. The multi-mode fibre 406 is then connected to this side of the chip.

A quantum communication system comprises a quantum transmitter optically coupled to a first waveguide; a first communication device optically coupled to a second waveguide; an optical fibre comprising a plurality of spatial channels; a spatial multiplexing unit, configured to optically couple the first waveguide to a first spatial channel in the third waveguide and the second waveguide to a second spatial channel in the third waveguide.

The multiplexing unit may be configured to optically couple the first waveguide to a first spatial channel in the third waveguide and the second waveguide to a second spatial channel in the third waveguide such that the polarisation of the quantum and classical signal are independent, and are not restricted to being orthogonal, for example.

The multiplexing unit may be configured not to cause significant polarisation dependent loss to a signal, i.e. such that any polarisation dependent loss is sufficiently small that it does not affect the functionality of the quantum and classical receivers.

The third waveguide may be a multi-mode optical fibre. The optical fibre may be configured to support transmission of signals in separate spatial modes having the any polarisation.

The spatial multiplexing unit may comprise a spatial mode de-multiplexer.

The spatial mode de-multiplexer may comprise a fibre bundle comprising a plurality of optical fibres, wherein the outer diameter of the cladding of each fibre in the fibre bundle is tapered at one end, and wherein a first optical fibre in the fibre bundle is optically coupled at the first end to a first mode in the multi-mode optical fibre and at the other end to the first waveguide, and wherein a second optical fibre in the fibre bundle is optically coupled at the first end to a second mode in the multi-mode optical fibre and at the other end to the second waveguide.

The spatial mode de-multiplexer may comprise a photonic chip, comprising a plurality of waveguides, wherein the spacing between the waveguides on the photonic chip at a first end is such that the light from the different waveguides on the chip is launched into a single multi-mode core fibre, and wherein a first waveguide on the photonic chip is optically coupled at the first end to a first mode in the multi-mode optical fibre and at the other end to the first waveguide, and wherein a second waveguide on the photonic chip is optically coupled at the first end to a second mode in the multi-mode optical fibre and at the other end to the second waveguide.

The multi-mode fibre may be configured to transmit less than 50 spatial modes. The multi-mode fibre may be configured to transmit less than 10 spatial modes. The multi-mode fibre may be configured to transmit 2 spatial modes. The multi-mode fibre may be in excess of 1 km. The multi-mode fibre may be in excess of 10 km. The multi-mode fibre may be in excess of 20 km.

The system may further comprise a wavelength division multiplexer. At least one of the first spatial channel and the second spatial channel in the third waveguide may be configured to transmit a plurality of signals using wavelength division multiplexing.

The third waveguide may be a multi-core optical fibre, wherein at least one of the cores is a multi-mode waveguide. The system may further comprise a fibre fan-out.

The quantum communication system may be a QKD system. The classical communication device may be configured to receive or transmit encrypted data.

The quantum communication system may comprise one or more further quantum communication devices, each optically coupled to a further waveguide; wherein the third waveguide comprises one or more further spatial channels and the spatial multiplexing unit is further configured to optically couple each further waveguide to a different further spatial channel in the third waveguide.

The quantum communication system may comprise one or more further classical communication devices, each optically coupled to a further waveguide; wherein the third waveguide comprises one or more further spatial channels and the spatial multiplexing unit is further configured to optically couple each further waveguide to a different further spatial channel in the third waveguide.

The quantum communication system may further comprise a quantum receiver, comprising at least one detector configured to detect quantum signals, and optically coupled to a fourth waveguide; a second communication device optically coupled to a fifth waveguide; a second spatial multiplexing unit, configured to optically couple the fourth waveguide to the first spatial channel in the third waveguide and the fifth waveguide to the second spatial channel in the third waveguide.

The quantum communication system may be configured to transmit data between the quantum transmitter and the quantum receiver without the use of wavelength filters. The quantum communication system may be configured to transmit data between the quantum transmitter and the quantum receiver without the use of polarising components.

The quantum communication system may further comprise a timing control module, configured to synchronise the quantum transmitter and quantum receiver, wherein the second communication device is configured to receive a synchronisation signal from the timing control module and send the synchronisation signal to the first communication device through the second spatial channel.

The quantum communication system may further comprise a timing control module, configured to synchronise the quantum transmitter and quantum receiver, wherein the first communication device is configured to receive a synchronisation signal from the timing control module and send the synchronisation signal to the second communication device through the second spatial channel.

The at least one detector may be a gated detector and the timing control module may be configured to synchronise the gating of the detector with the arrival time of signals from the quantum transmitter.

The quantum receiver may comprise a decoder and the quantum transmitter may comprise an encoder, configured to generate an encryption key between the quantum receiver and the quantum transmitter.

The quantum communication system may further comprise a module configured to encrypt classical data using the generated encryption key and a module configured to decrypt classical encrypted data using the generated encryption key, and wherein the first classical communication device and second classical communication device are configured to exchange encrypted classical data.

The quantum communication system may further comprise a feedback control unit configured to generate a feedback signal, wherein the second classical communication device is configured to transmit the feedback signal to the first classical communication device, the quantum transmitter comprising a control element configured to be controlled by the feedback signal.

The quantum transmitter is configured to emit pulses of photons, wherein the average number of photons in a pulse is less than 1.

The quantum transmitter may comprise a pulsed laser and an optical attenuator.

A quantum communication system comprises a receiver, comprising at least one detector configured to detect quantum signals, and optically coupled to a first waveguide; a second communication device optically coupled to a second waveguide; a third waveguide comprising a plurality of spatial channels; a spatial multiplexing unit, configured to optically couple the first waveguide to a first spatial channel in the third waveguide and the second waveguide to a second spatial channel in the third waveguide.

A quantum communication method for communicating over a system comprising a quantum transmitter, a first communication device, a first spatial multiplexing unit, a third waveguide comprising a plurality of spatial channels, a second spatial multiplexing unit, a quantum receiver and a second communication device, comprises the steps of: sending quantum signals from the quantum transmitter to the first spatial multiplexing unit; directing the quantum signals into a first spatial channel in the third waveguide; receiving the quantum signals from the first spatial channel at the second spatial multiplexing unit; directing the quantum signals to the quantum receiver; sending signals from one of the first communication device or the second communication device to one of the first spatial multiplexing unit or the second spatial multiplexing unit; directing the signals into a second spatial channel in the third waveguide; receiving the signals from the second spatial channel at the other of the first spatial multiplexing unit or the second spatial multiplexing unit; directing the signals to the other of the first communication device or the second communication device.

Figure 4B:
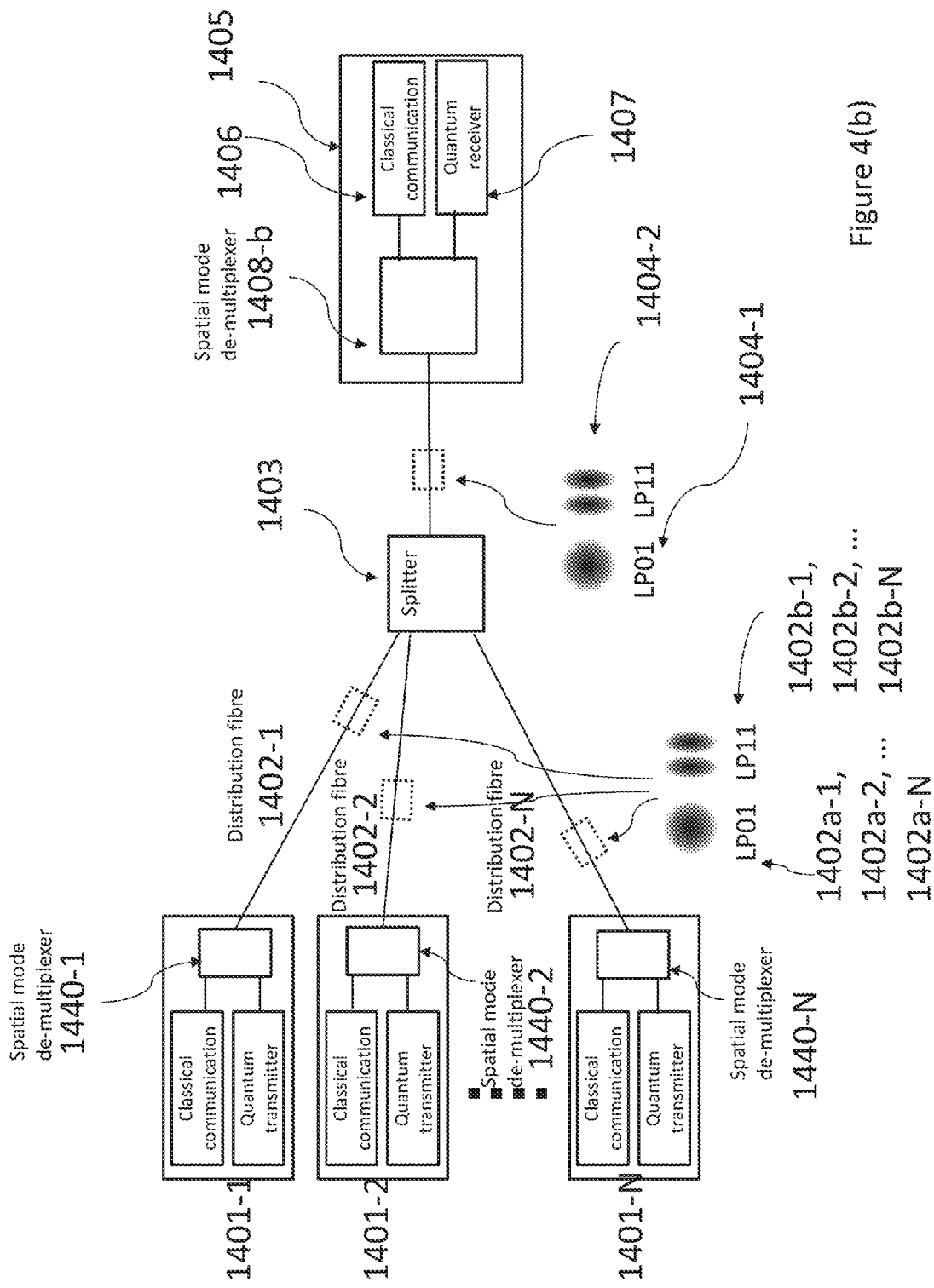
FIG. 4B shows a schematic illustration of a quantum communication system, comprising a few-mode or multi-mode optical fibre and a plurality of quantum transmitters.

FIG. 4B shows a schematic illustration of a quantum communication system comprising a multi-mode, or few-mode, splitter 1403. In a multi-mode, or few-mode, splitter, all waveguides are multi-mode, or few-mode, waveguides. Light inputted from a first multi-mode waveguide in a first spatial mode is outputted from the multi-mode splitter into a plurality of multi-mode waveguides, in the first spatial mode. Light inputted from the first multi-mode waveguide in a second spatial mode is outputted from the multi-mode splitter into the plurality of multi-mode waveguides, in the second spatial mode.

A quantum communication system comprises a plurality of transmitter units, each transmitter unit comprising a source of quantum signals; a receiver unit, comprising: a quantum receiver, comprising at least one detector configured to detect quantum signals; and a first classical communication device; and a multi-mode splitter, wherein the plurality of transmitter units are optically coupled to the receiver unit through the multi-mode splitter, wherein the multi-mode splitter is optically coupled to the quantum receiver through a first spatial channel and optically coupled to the first classical communication device through a second spatial channel.

The multi-mode splitter 1403 may use evanescent coupling to couple light from one multi-mode waveguide into one or several other multi-mode waveguides. The multi-mode splitter 1403 may comprise two or more multi-mode optical fibres, wherein the cladding thickness of the optical fibres is reduced, and two or more fibres are arranged in close contact. In the contact region, light is evanescently coupled from a first multi-mode fibre into the other multi-mode fibres in an oscillatory manner, i.e. the length of the coupling region determines how much light is coupled from one multi-mode fibre into the multi-mode other fibres. Light in a first spatial mode in the first multi-mode fibre is evanescently coupled into the other multi-mode fibres in the first spatial mode. Light in a second spatial mode in the first multi-mode fibre is evanescently coupled into the other multi-mode fibres in the second spatial mode. The length of the coupling region determines the splitting ratio. The length of the coupling region can be such that, for example, 50% of the light is coupled from one waveguide to the other.

The multi-mode splitter 1403 may be implemented on a photonic chip. Several waveguides on the photonic chip are arranged in close contact to each other, such that in the contact region, light is evanescently coupled from one waveguide into the other waveguides.

The multi-mode splitter may be a plurality of 1×2 multi-mode splitters and/or 2×2 multi-mode splitters connected together in a cascading fashion.

Alternatively, the multi-mode splitter may comprise a single multi-mode splitter having M input waveguides and N output waveguides arranged in close contact, such that light is coupled from the M waveguides into the N waveguides.

The multi-mode splitter may be an optical cross coupler, in which two multi-mode waveguides are crossed in order to couple light from one waveguide to another.

The units 1401-1 to 1401-N each comprise a classical communication device and a quantum communication device. The units 1401-1 to 1401-N also each comprise a spatial mode de-multiplexer 1440-1 to 1440-N.

The distribution fibres 1402-1 to 1402-N between the units 1401-1 to 1401-N and the multi-mode splitter 1403 are multi-mode waveguides, or few-mode waveguides. Each fibre 1402-1 to 1402-N may support transmission of a first spatial mode LP01 and a second spatial mode LP11. The fibres 1402-1 to 1402-N may support transmission of further spatial modes. Each unit 1401-1 to 1401-N is optically coupled to the multi-mode splitter 1403 through a first spatial channel 1402*a* and a second spatial channel 1402*b*. The first spatial channel 1402*a* comprises a first spatial mode LP01 and the second spatial channel 1402*b* comprises a second spatial mode LP11.

Each multi-mode or few-mode fibre 1402-1 to 1402-N is optically coupled to the respective spatial mode de-multiplexer 1440-1 to 1440-N. A first waveguide connects between the respective spatial mode de-multiplexer 1440-1 to 1440-N and the classical communication device in the unit and a second waveguide connects between the respective spatial mode de-multiplexer 1440-1 to 1440-N and the quantum transmitter in the unit. The respective spatial mode de-multiplexer 1440-1 to 1440-N optically couples first spatial channel 1402*a* comprising first spatial mode LP01 to the first waveguide and the second spatial channel 1402*b* comprising second spatial mode LP11 to the second waveguide.

The unit 1405 is optically coupled to the multi-mode splitter 1403 by a multi-mode or few-mode fibre. The multi-mode or few-mode fibre supports transmission of a first spatial mode LP01 and a second spatial mode LP11. Thus the unit 1405 is optically coupled to the multi-mode splitter 1403 through a first spatial channel 1404-1 and a second spatial channel 1404-2. The first spatial channel 1404-1 comprises a first spatial mode LP01 and the second spatial channel 1404-2 comprises a second spatial mode LP11.

Unit 1405 comprises a classical communication device 1406 and a quantum receiver 1407. Unit 1405 also comprises a spatial mode de-multiplexer 1408-*b*. The multi-mode or few-mode fibre comprising spatial channels 1404-1 and 1404-2 is optically coupled to the spatial mode de-multiplexer 1408-*b*. A first waveguide connects between the spatial mode de-multiplexer 1408-*b* and the classical communication device 1406 and a second waveguide connects between the second spatial mode de-multiplexer 1408-*b* and the quantum receiver 1407. The spatial mode de-multiplexer 1408-*b* optically couples first spatial channel 1404-1 comprising first spatial mode LP01 to the first waveguide and the second spatial channel 1404-2 comprising second spatial mode LP11 to the second waveguide.

Signals in spatial channel 1404-1 are distributed with a fraction 1/N into spatial channels 1402*a*-1 to 1402*a*-N and signals in spatial channel 1404-2 are distributed with a fraction 1/N into spatial channels 1402*b*-1 to 1402*b*-N. Quantum and classical channels are transmitted over separate spatial channels in the whole network.

A multi-mode fibre could be used instead of the multi-core fibre 506 shown in FIG. 5B. A multi-mode fibre could be used for fibre 606 in FIG. 6, 706 in FIGS. 7 and 806 in FIG. 8. Spatial multiplexing units 605 and 607 in FIGS. 6, 705 and 707 in FIGS. 7 and 805 and 807 in FIG. 8 may be a fibre fan-out.

Figure 5A:
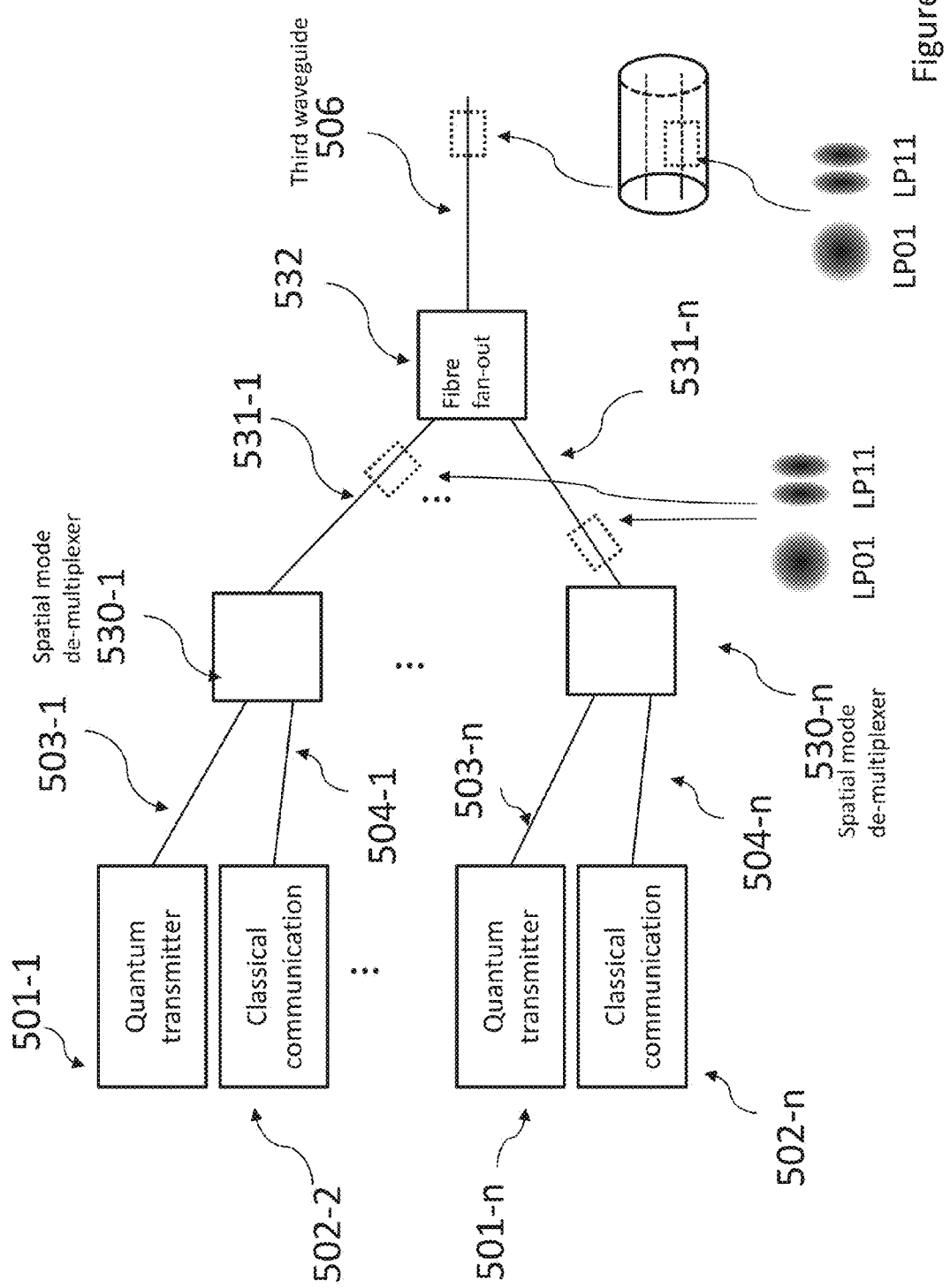
FIG. 5A shows a schematic illustration of a quantum communication system according to an embodiment, comprising a multi-core fibre with multi-mode cores.
Figure 5B:
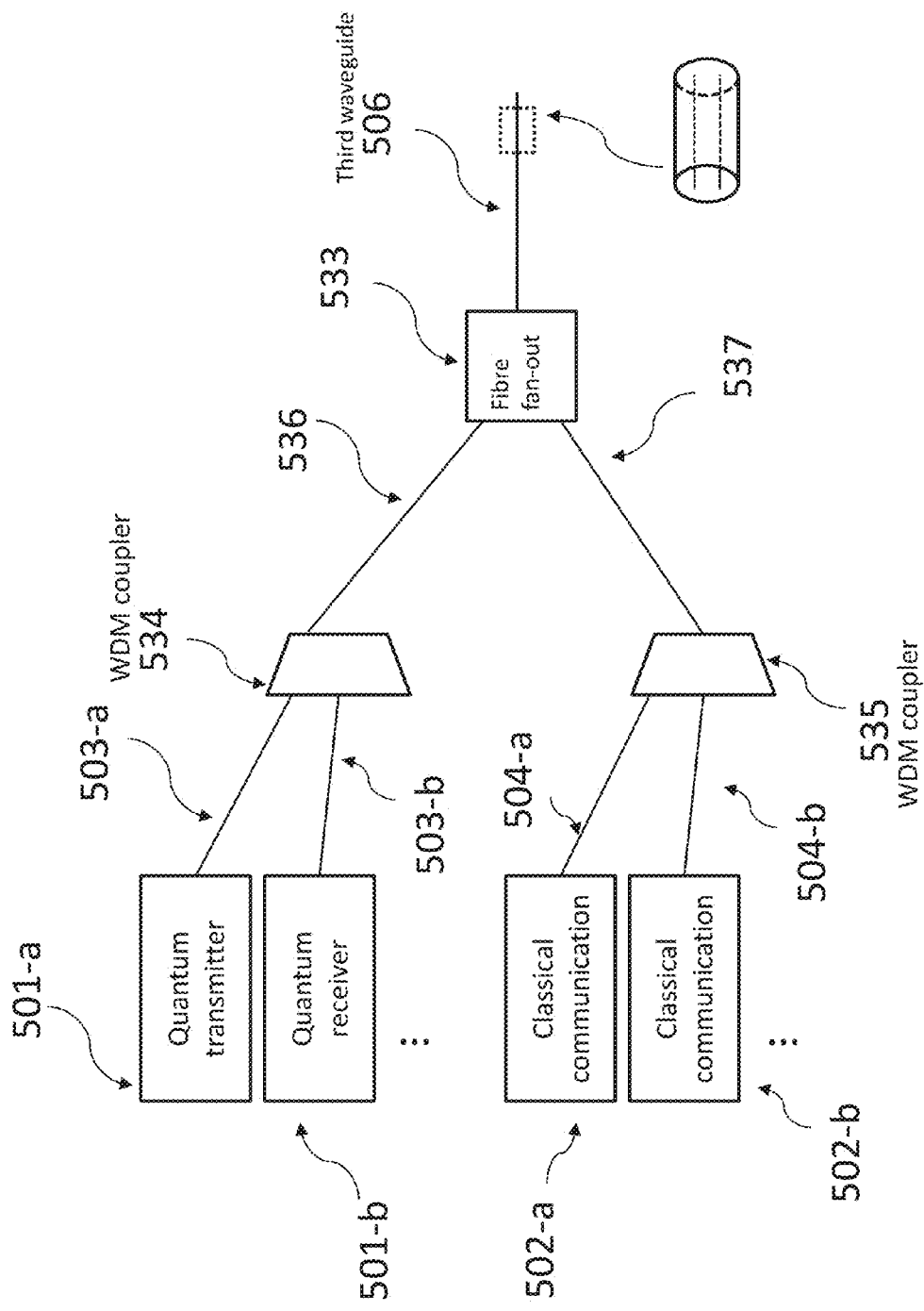
FIG. 5B shows a schematic illustration of a quantum communication system according to an embodiment, in which each spatial channel transmits a plurality of quantum signals or classical signals using wavelength division multiplexing.

FIG. 5A is a schematic illustration of a quantum communication system according to an embodiment, in which optical fibre 506 is a multi-core fibre with multi-mode cores. Each core in the multi-core fibre 506 is a multi-mode fibre, which supports transmission of several spatial modes in the same core.

The system comprises multiple quantum communication devices 501-1 to 501-*n*, each having a corresponding classical communication device 502-1 to 502-*n*. In the system shown, the quantum communication devices are quantum transmitters, however some or all of the devices may be quantum receivers. The quantum transmitters 501-1 to 501-*n* are optically coupled to first waveguides 503-1 to 503-*n* and the classical communication devices 502-1 to 502-*n* are optically coupled to second waveguides 504-1 to 504-*n*. Waveguides 503-1 to 503-*n* and waveguides 504-1 to 504-*n* are optically coupled to spatial mode de-multiplexers 530-1 to 530-*n* 532. Waveguide 503-1 and waveguide 504-1 are optically coupled to spatial mode de-multiplexer 530-1. Each pair of waveguides 503-*n* and 504-*n* are connected to a corresponding spatial mode de-multiplexer 530-*n*. Each spatial mode de-multiplexer 530-1 to 530-*n* is connected by a multi-mode waveguide 531-1 to 531-*n* to fibre fan-out 532. A third waveguide 506, which is a multi-core fibre with multi-mode cores is also optically coupled to the fibre fan-out 532.

The multi-core optical fibre 506 permits transmission of two or more spatial modes per core. Fibre fan-out 532 directs signals transmitted from a first core of the multi-core fibre 506 into the multi-mode waveguide 531-1 and from a second core into a multi-mode waveguide 531-2, and so on. For transmissions in the other direction, fibre fan-out 532 directs signals transmitted from the multi-mode waveguide 531-1 into the first core and signals transmitted from the second multi-mode waveguide 531-2 into the second core, and so on. The fibre fan-out 532 connects several multi-mode fibres 531-1 to 531-*n* to a multi-core fibre 506, in which each core is a multi-mode core. Each core in the multi-core fibre is optically coupled to a multi-mode waveguide 531-1 to 531-*n* through the fibre fan-out 532.

Each multi-mode fibre 531-1 to 531-*n* is connected to a corresponding spatial mode de-multiplexer 530-1 to 530-*n*. Spatial mode de-multiplexer 530-1 directs input signals from fibre 531-1 in mode LP01 into a first single-mode waveguide 503-1 and input signals from fibre 531-1 in mode LP11 into a second single-mode waveguide 504-1. For transmissions in the other direction, spatial mode de-multiplexer 530-1 directs signals transmitted from the single-mode waveguide 503-1 into the fibre 531-1 in mode LP01 and signals transmitted from the second single-mode waveguide 504-1 into fibre 531-1 in mode LP11. Each spatial mode de-multiplexer directs signals between the corresponding waveguides 503-1 to 503-*n* and 504-1 to 504-*n* and the corresponding multi-mode waveguides 531-1 to 531-*n*. Although only two spatial modes are shown, multi-mode fibres capable of transmitting more spatial modes may be used.

The fibre fan-out 532 is configured to optically couple the first single mode waveguide 503-1 and second single mode waveguide 504-1 to a first core in the multi-core waveguide 506. The fibre fan-out is configured to optically couple a third single mode waveguide 503-2 and a fourth single mode waveguide 504-2 to a second core in the multi-core waveguide 506, and so on.

Although a system in which the multi-core waveguide is coupled to a fibre-fan out (to separate the cores) and then to a plurality of spatial mode de-multiplexers (to separate the modes) is shown, alternatively, the modes may be separated first, and then the cores.

Different combinations of quantum and classical transmitters and receivers are possible. In one embodiment, device 502-2 is a second quantum communication device.

In the above described system, a multi-core fibre in which each core has is a multi-mode core is used to increase the capacity of the system. Other multiplexing techniques could also be used to increase the capacity of the system. For example, each spatial channel can transmit a plurality of signals using wavelength division multiplexing.

In one embodiment, WDM is used to transmit multiple signals at different wavelengths along a mode in a core of the multi-core fibre. Other methods of increasing the capacity of the system, such as multiplexing with two orthogonal polarisations can also be used. Multiplexing using polarisation may be achieved using a polarising beam splitter for example.

FIG. 5B shows a schematic illustration of a quantum communication system according to an embodiment, which is an example of a system in which each spatial channel transmits a plurality of quantum signals or classical signals using wavelength division multiplexing. Instead of multi-core fibre 506, a multi-core fibre in which each core is a multi-mode fibre could be used.

The system comprises a quantum transmitter 501-*a* and a quantum receiver 501-*b*, each optically coupled to one of waveguides 503-*a* and 503-*b*. The system further comprises a classical communication device 502-*a* and a classical communication device 502-*b*, each optically coupled to one of waveguides 504-*a* and 504-*b*. Many alternative numbers and combinations of quantum and classical transmitters and receivers are possible. In an embodiment, the quantum signals and classical signals are transmitted along separate spatial channels.

Figure 7:
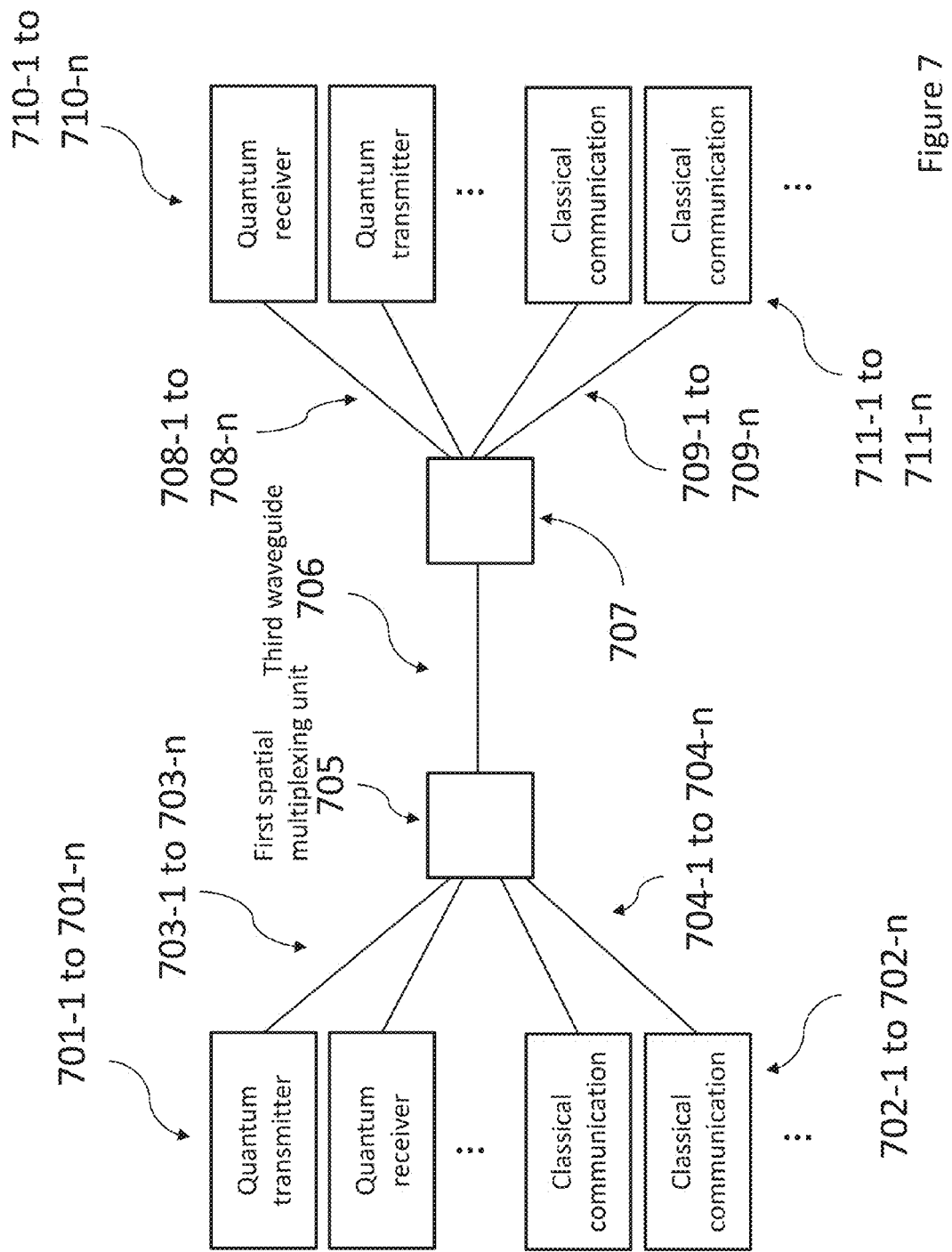
FIG. 7 is a schematic illustration of a quantum communication system in accordance with an embodiment, comprising multiple communication devices.

The system shown in FIG. 5B comprises multiple QKD systems, used to increase the capacity of the quantum channel. The multi-core fibre 506 may be connected to a second fibre fan-out, which connects to receivers and transmitters, each corresponding to one of the transmitters and receivers shown in the figure. This is shown in FIG. 7, described later for example. In general, however, what is shown is part of a larger network. The quantum signal may be distributed at the other end of the multi-core fibre 506 into different fibres going to different locations. In the most general case the network is reconfigurable for example by using a switch to switch the different quantum signals into different fibres.

Waveguides 503-*a* and 503-*b* are optically coupled to a WDM coupler 534. Waveguides 504-*a* and 504-*b* are optically coupled to a WDM coupler 535. WDM couplers (also referred to as WDM modules or wavelength filters) may be based on thin-film wavelength filters. A first filter reflects or transmits a selected wavelength and lets all other wavelengths pass. The remaining light is sent onto a second filter, which reflects or transmits a second selected wavelength and lets all other wavelengths pass, and so on. Other types of WDM modules may be based on arrayed waveguide gratings (AWGs). These may be integrated on a chip and use interference to direct light of a selected wavelength into a selected waveguide. Other types of WDM modules may be based on fibre Bragg gratings, which are gratings inscribed into an optical fibre which reflect or transmit a selected wavelength.

Waveguide 536 is optically coupled to WDM coupler 534 and waveguide 537 is optically coupled to WDM coupler 535. Waveguides 536 and 537 are optically coupled to fibre fan-out 533. Multi-core fibre 506 is optically coupled to fibre fan-out 533.

Fibres 503 and 504 could be long fibre links, for example, of the order of kilometers long. Fibre links 536 and 537 could also be of the order of kilometers long. Filter 535 may remove (or drop) just a single wavelength channel for example, and there may be further filters removing more channels at different locations. Switches may also be used to switch signals between different transmitters or receivers.

Fibre fan-out 533 directs input signals from a first core in fibre 506 into waveguide 536 and input signals from a second core in fibre 506 into waveguide 537. Multiple signals at different wavelengths are transmitted in each core. For signals travelling in the other direction, fibre fan-out 533 directs signals transmitted from the waveguide 536 into the first core in fibre 506 and signals transmitted from the waveguide 537 into the second core in fibre 506.

WDM coupler 534 directs input signals from fibre 503-*a* into fibre 536 and input signals from fibre 503-*b* into fibre 536. For signals travelling in the other direction, WDM coupler directs input signals having a first wavelength from fibre 536 into fibre 503-*a* and input signals having a second wavelength from fibre 536 into fibre 503-*b*.

The fibre fan-out 533 is configured to optically couple the first single mode waveguide 503-*a* and second single mode waveguide 503-*b* to a first core in the multi-core waveguide 506. The fibre fan-out is configured to optically couple a third single mode waveguide 504-*a* and a fourth single mode waveguide 504-*b* to a second core in the multi-core waveguide 506, and so on.

Figure 6:
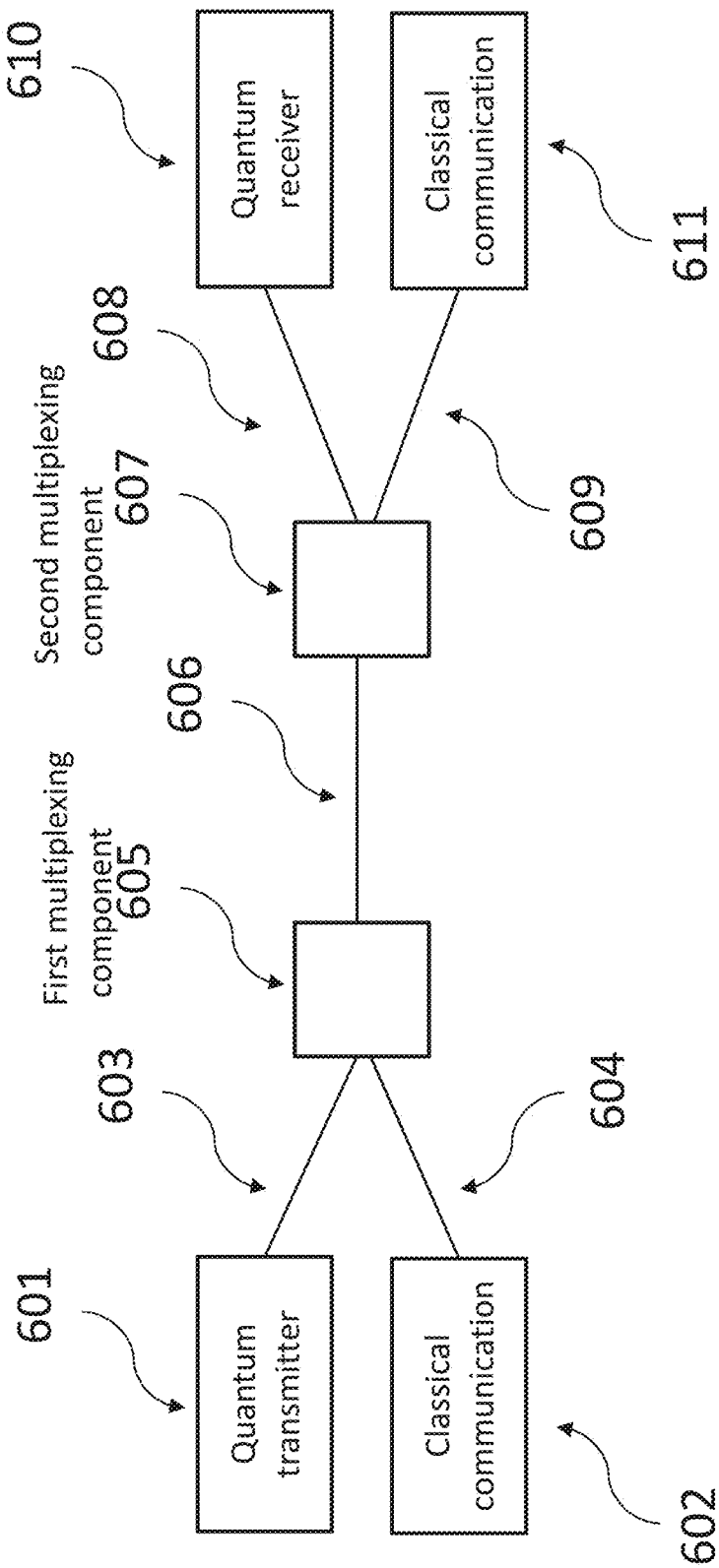
FIG. 6 is a schematic illustration of a quantum communication system in accordance with an embodiment, comprising a quantum transmitter, two spatial multiplexing units and a quantum receiver.

FIG. 6 is a schematic illustration of a quantum communication system in accordance with an embodiment. The system comprises a quantum transmitter, two spatial multiplexing units and a quantum receiver. The classical communication can be transmitted in either or both directions, for example using WDM.

The communication system comprises a quantum transmitter 601 and a classical communication device 602. The quantum transmitter 601 is optically coupled to a first waveguide 603 and the classical communication device 602 is optically coupled to a second waveguide 604. The first waveguide 603 and the second waveguide 604 are optically coupled to a first multiplexing component 605. A third waveguide 606 is also optically coupled to the first multiplexing component 605. The third waveguide 606 is configured to allow transmission of different signals along different spatial channels. The third waveguide 605 comprises a plurality of spatial channels. The first multiplexing component 605 is configured to optically couple the first waveguide 603 to a first spatial channel in the third waveguide 606 and the second waveguide 604 to a second spatial channel in the third waveguide 606.

The third waveguide 606 is also optically coupled to the second multiplexing component 607. The communication system also comprises a quantum receiver 610 and a classical communication device 611. The quantum receiver 610 is optically coupled to a fourth waveguide 608 and the classical communication device 611 is optically coupled to a fifth waveguide 609. The fourth waveguide 608 and the fifth waveguide 609 are optically coupled to the second multiplexing component 607. The second multiplexing component 607 is configured to optically couple the fourth waveguide 608 to a first spatial channel in the third waveguide 606 and the fifth waveguide 609 to a second spatial channel in the third waveguide 606.

In one embodiment, the third waveguide 606 is a multi-core fibre. The first multiplexing unit 605 and the second multiplexing unit 607 may be a fibre fan-out.

Where the classical communication device 602 comprises a source of classical signals and the classical communication device 611 comprises a classical receiver, the classical transmitter 602 transmits a classical signal into optical waveguide 604. The signal is inputted into the spatial multiplexing unit 605. The spatial multiplexing unit 105 directs the signal into the fibre link 606, in a second spatial channel. The classical signal is transmitted along the second spatial channel in the fibre link 606, and is directed by the spatial multiplexing unit 607 into optical waveguide 609. The signal is then received by the classical receiver 611.

Where the classical communication device 611 comprises a source of classical signals and the classical communication device 602 comprises a classical receiver, the classical transmitter 611 transmits a classical signal into optical waveguide 609. The signal is inputted into the spatial multiplexing unit 607. The spatial multiplexing unit 607 directs the signal into the fibre link 606, in a second spatial channel. The classical signal is transmitted along the second spatial channel in the fibre link 606, and is directed by the spatial multiplexing unit 605 into optical waveguide 604. The signal is received by the classical receiver 602.

The quantum transmitter 601 transmits a quantum signal into optical waveguide 603. The signal is inputted into the first spatial multiplexing unit 605. The first spatial multiplexing unit 605 directs the signal into the fibre link 606, in a first spatial channel. The quantum signal is transmitted along the first spatial channel in the fibre link 606, and is directed by the second spatial multiplexing unit 607 into optical waveguide 608. The signal is received by the quantum receiver 610.

In one embodiment, instead of being connected to a second fibre fan-out 607, the multi-core fibre 606 is connected at the other end to a multi-core splitter. In a multi-core splitter, light inputted from a first core in a multi-core waveguide is outputted into the first core in a plurality of multi-core waveguides. Light inputted from a second core in a multi-core waveguide is outputted into the second core in the plurality of multi-core waveguides.

A multi-core splitter uses evanescent coupling to couple light from one core into several other cores in other multi-core waveguides. The cladding thickness around the cores is reduced, and two or more cores are arranged in close contact. In the contact region, light is evanescently coupled from a first core in a first multi-core fibre into the first cores in other multi-core fibres in an oscillatory manner, i.e. the length of the coupling region determines how much light is coupled from one core into the other cores. The length of the coupling region determines the splitting ratio. The length of the coupling region can be such that, for example, 50% of the light is coupled from one waveguide to the other.

In one embodiment, the multi-core splitter is implemented on a photonic chip. Several multi-core waveguides on the photonic chip are arranged in close contact to each other, such that in the contact region, light is evanescently coupled from one waveguide into the other waveguides.

In an embodiment, the multi-core splitter comprises a plurality of 1×2 multi-core splitters and/or 2×2 multi-core splitters connected together in a cascading fashion.

Alternatively, the multi-core splitter may comprise a single multi-core splitter having M input multi-core waveguides and N output multi-core waveguides arranged in close contact, such that light is coupled from the M multi-core waveguides into the N multi-core waveguides.

In one embodiment, the multi-core splitter is an optical cross coupler, in which two multi-core waveguides are crossed in order to couple light from one waveguide to another.

Alternatively, instead of a multi-core splitter, the multi-core fibre 606 is connected at the other end to a further fibre fan-out, followed by multiple optical beam splitters and multiple fibre fan-outs, in order to combine the signals again into different cores of the multiple multi-core fibres. These components could all be integrated on a single photonic chip for example.

The system may comprise several units, each having a quantum transmitter 601 and a classical communication device 602, and a single unit having a quantum receiver 610 and a classical communication device 611.

Each quantum transmitter 601 and classical communication device 602 is connected to a fibre-fan out 605, in the same manner as is shown in FIG. 6. Each fibre-fan out 605 is connected to a multi-core waveguide 606. The fibre fan-out optically couples a first core in the multi-mode waveguide 606 to the first waveguide 604 and a second core in the multi-core waveguide 606 to the second waveguide 603.

Each multi-core waveguide 606 is optically coupled the multi-core splitter. The quantum receiver 610 and classical communication device 611 are optically coupled to the multi-core splitter by a second multi-core fibre. A first waveguide 609 connects between a fibre fan-out 607 and the classical communication device 611 and a second waveguide 608 connects between the fibre fan-out 607 and the quantum receiver 610. The fibre fan-out 607 optically couples a first core in the second multi-mode waveguide to the first waveguide 609 and a second core in the second multi-core waveguide to the second waveguide 608. The second multi-core waveguide is connected to the multi-core splitter.

Fibre 606 may be a multi-core fibre. Spatial multiplexing unit 605 and spatial multiplexing unit 607 may be a fibre fan-out.

FIG. 7 is a schematic illustration of a quantum communication system in accordance with an embodiment, in which multiple signals travel in multiple spatial channels.

There may be a single quantum channel and several classical channels; or multiple quantum channels and a single classical channel; or multiple quantum and classical channels. Many alternative numbers and combinations of quantum and classical transmitters and receivers are possible. In an embodiment, the quantum signals and classical signals are transmitted along separate spatial channels.

The communication system comprises a plurality of quantum communication devices 701-1 to 701-*n*, which may be quantum receivers or quantum transmitters, and a plurality of classical communication devices 702-1 to 702-*n*, which may be classical transmitters or classical receivers. The quantum communication devices 701-1 to 701-*n* are optically coupled to waveguides 703-1 to 703-*n* and the classical communication devices 702-1 to 702-*n* are optically coupled to waveguides 704-1 to 704-*n*. The waveguides 703-1 to 703-*n* are optically coupled to a first spatial multiplexing unit 705. A third waveguide 706 is also optically coupled to the first spatial multiplexing unit 705. The third waveguide 706 is configured to allow transmission of different signals along a plurality of different spatial channels. Each spatial channel is optically coupled to one of the waveguides 703-1 to 703-*n* or 704-1 to 704-*n* through the first spatial multiplexing unit 705.

The third waveguide 706 is also optically coupled to a second spatial multiplexing unit 707. The communication system also comprises a plurality of quantum communication devices 710-1 to 710-*n* and a plurality of classical communication devices 711-1 to 711-*n*. The quantum communication devices 710-1 to 701-*n* are optically coupled to waveguides 708-1 to 708-*n* and the classical communication devices 711-1 to 711-*n* are optically coupled to waveguides 709-1 to 709-*n*. The waveguides 708-1 to 708-*n* and 709-1 to 709-*n* are optically coupled to the second spatial multiplexing unit 707. Each spatial channel is optically coupled to one of the waveguides 708-1 to 708-*n* or 709-1 to 709-*n* through the second spatial multiplexing unit 707.

Where the classical communication device 702-1 comprises a source of classical signals and the classical communication device 711-1 comprises a classical receiver for example, the classical transmitter 702-1 transmits a classical signal into optical waveguide 704-1. The signal is inputted into the first spatial multiplexing unit 705. The first spatial multiplexing unit 705 directs the signal into the fibre link 706, in a first spatial channel. The classical signal is transmitted along the first spatial channel in the fibre link 706, and is directed by the second spatial multiplexing unit 707 into optical waveguide 709-1. The signal is then received by the classical receiver 711-1.

Where the classical communication device 711-2 comprises a source of classical signals and the classical communication device 702-2 comprises a classical receiver, for example, the classical transmitter 711-2 transmits a classical signal into optical waveguide 709-2. The signal is inputted into the second spatial multiplexing unit 707. The second spatial multiplexing unit 707 directs the signal into the fibre link 706, in a second spatial channel. The classical signal is transmitted along the second spatial channel in the fibre link 706, and is directed by the first spatial multiplexing unit 705 into optical waveguide 704-2. The signal is received by the classical receiver 702-2.

Where the quantum communication device 701-1 comprises a quantum transmitter and the quantum communication device 710-1 comprises a quantum receiver for example, the quantum transmitter 701-1 transmits a quantum signal into optical waveguide 703-1. The signal is inputted into the first spatial multiplexing unit 705. The spatial first multiplexing unit 705 directs the signal into the fibre link 706, in a third spatial channel. The quantum signal is transmitted along the third spatial channel in the fibre link 706, and is directed by the second spatial multiplexing unit 707 into optical waveguide 708-1. The signal is then received by the quantum receiver 710-1.

Where the quantum communication device 710-2 comprises a quantum transmitter and the quantum communication device 701-2 comprises a quantum receiver, for example, the quantum transmitter 710-2 transmits a quantum signal into optical waveguide 709-2. The signal is inputted into the second spatial multiplexing unit 707. The second spatial multiplexing unit 707 directs the signal into the fibre link 706, in a fourth spatial channel. The quantum signal is transmitted along the fourth spatial channel in the fibre link 706, and is directed by the first spatial multiplexing unit 705 into optical waveguide 703-2. The signal is received by the quantum receiver 701-2.

Fibre 706 may be a multi-core fibre. Spatial multiplexing unit 705 and spatial multiplexing unit 707 may be a fibre fan-out.

Figure 8:
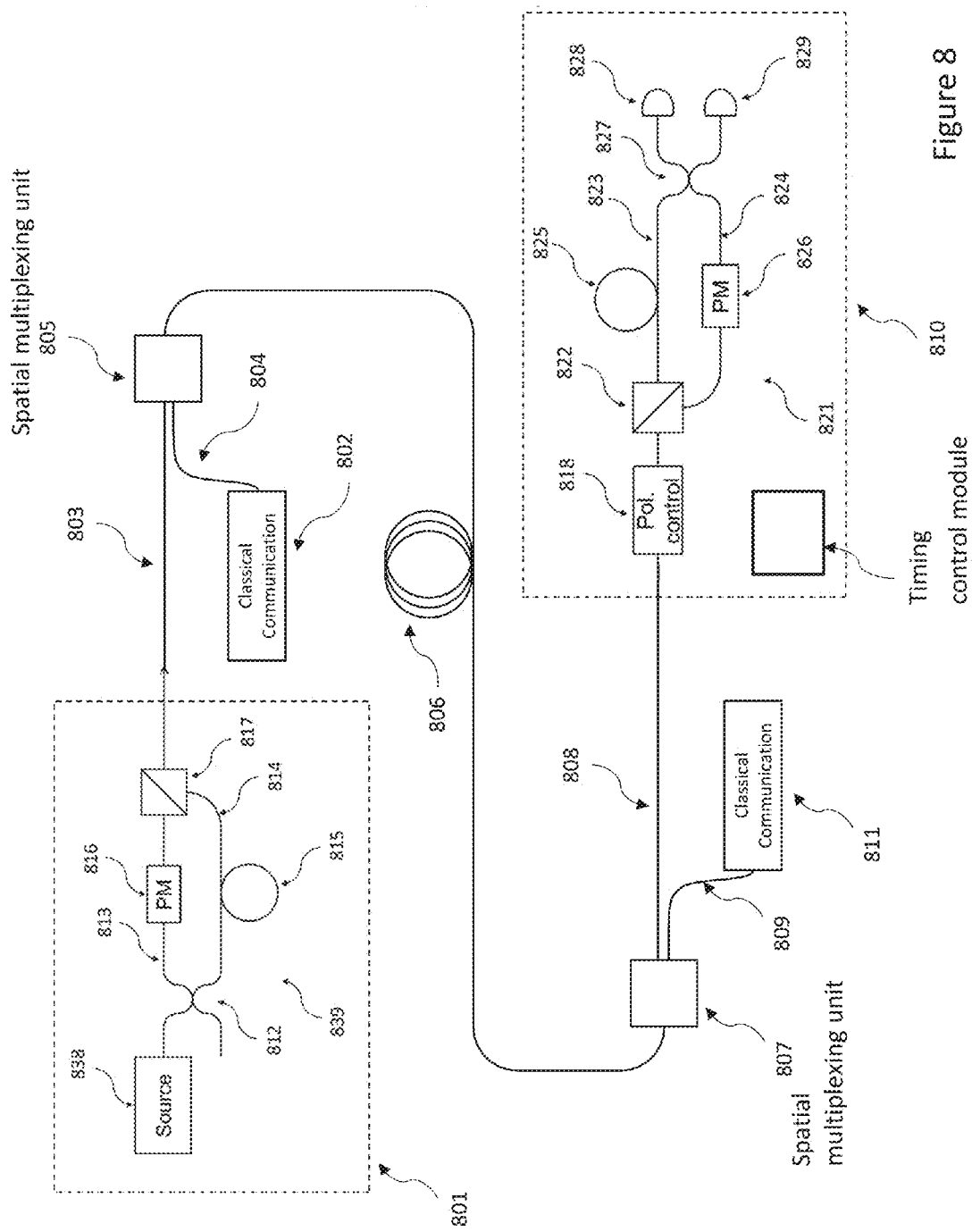
FIG. 8 is a schematic illustration of a quantum communication system in accordance with an embodiment, where the quantum transmitter and the quantum receiver are based on asymmetrical Mach-Zehnder interferometers.

FIG. 8 is a schematic illustration of a quantum communication system in accordance with an embodiment, where the quantum transmitter 801 and the quantum receiver 810 are based on asymmetrical Mach-Zehnder interferometers (MZI).

Quantum transmitter 801 and quantum receiver 810 are optically coupled through fibre 803, spatial multiplexing unit 805, fibre 806, spatial multiplexing unit 807 and fibre 808. Fibre 806 comprises at least two spatial channels. The quantum transmitter 801 and quantum receiver 810 are optically coupled through a first spatial channel. Classical communication device 802 and classical communication device 811 are optically coupled through fibre 804, spatial multiplexing unit 805, a second spatial channel in fibre 806, spatial multiplexing unit 807 and fibre 809. This may be referred to collectively as the classical channel.

Fibre 806 may be a multi-core fibre. Spatial multiplexing unit 805 and spatial multiplexing unit 807 may be a fibre fan-out.

Spatial multiplexing unit 805 is configured to optically couple the waveguide 803 to a first spatial channel in the waveguide 806 and the waveguide 804 to a second spatial channel in the waveguide 806. Spatial multiplexing unit 807 is configured to optically couple the waveguide 808 to a first spatial channel in the waveguide 806 and the waveguide 809 to a second spatial channel in the waveguide 806.

Photon source 838 inside quantum transmitter 801 generates a quantum signal, comprising pulses of light. The pulses are then encoded using the asymmetrical MZI 839. The pulses are directed into a beam splitter 812. One output of the beam splitter 812 is connected to a phase modulator 816. The output of the phase modulator 816 is connected to polarising beam combiner 817. This forms the short arm 813 of the interferometer. The other output of the beam splitter 812 is connected to a fibre loop 815, which is in turn connected to polarising beam combiner 817. This forms the long arm 814 of the interferometer. Light pulses travelling the long arm 814 are delayed with respect to light pulses travelling the short arm 813.

Quantum transmitter 801 may also comprise an intensity modulator configured to vary the intensity of light pulses. The intensity modulator may be configured to realise a decoy-state QKD protocol, in which pulses of different intensities are sent which allows the sender and receiver to determine the presence of an eavesdropper by measuring the number of pulses which have been safely received with the different intensities. The quantum transmitter 801 may comprise more than one intensity modulator.

Phase modulator 816 is configured to apply a modulation to the phase of a light pulse travelling the short arm 813. A phase modulator can comprise a crystal, such as a $LiNbO_3$ crystal, in which the refractive index is a function of electric field strength. Alternatively the phase modulation can be provided by passive means, for example, a plurality of fixed phase elements which are each configured to apply a different fixed phase difference and a switch configured to select each of the said components.

The polarisation of a light pulse from the short arm 813 of the interferometer is flipped by the polarizing beam combiner 817, from a first polarisation to a second polarisation, which is orthogonal to the first polarisation. The quantum transmitter 801 therefore generates coherent double pulses with a chosen phase difference and orthogonal polarization travelling down the fibre 803.

Quantum light pulses exit the quantum transmitter 801 and are sent via fibre 803 to spatial multiplexing unit 805. Spatial multiplexing unit 805 sends signals inputted from fibre 803 into fibre 806, in a first spatial channel. The quantum signals are sent via the first spatial channel of fibre 806 to spatial multiplexing unit 807. Spatial multiplexing unit 807 sends signals inputted from a first spatial channel into fibre 808.

In the quantum receiver 810, a polarisation controller 818 corrects any deviation of the polarisation of the pulses. The pulses are then decoded using the asymmetrical MZI 821. The short arm 824 of the interferometer 821 comprises a phase modulator 826, such as has been described previously. The long arm 823 of the interferometer comprises a fibre loop 825, which exactly matches the fibre loop 815 in the transmitter. The long arm 823 and the short arm 824 are each connected to one of the outputs of the polarizing beam splitter 822 and to one of the inputs of beam splitter 827.

The polarizing beam splitter 822 sends a light pulse that enters with the second polarization down the long arm 823 of the interferometer and a light pulse that enters the polarizing beam splitter with the first polarization down the short arm 824. The polarization of a pulse travelling through the polarizing beam splitter 822 with the second polarisation is flipped to the first polarisation.

The outputs of beam splitter 827 are connected to photon detectors 828 and 829. Depending on the phase modulation applied at the transmitter 801 and the receiver 810, a signal will either be detected in photon detector 828 or in photon detector 829. Photon detectors 828 and 829 may be gated single-photon detectors which may be based on avalanche photo-diodes and specifically may be based on InGaAs avalanche photo-diodes.

Using phase modulator 816 and phase modulator 826 a Quantum Key Distribution protocol such as BB84 can be realized. In the BB84 protocol, Alice (at the transmitter 801) selects a phase value at random from four equally spaced phase values. For example, Alice can randomly set the phase modulator 816 to one of four different values, corresponding to phase shifts of $0$, $\pi/2$, $\pi$, and $3\pi/2$. $0$ and $\pi$ are associated with bits 0 and 1 in a first encoding basis, while $\pi/2$ and $3\pi/2$ are associated with 0 and 1 in a second encoding basis.

Bob (at the receiver 810) can randomly set the phase modulator 826 to one of two values, corresponding to a phase shift of $0$ or $\pi/2$. This amounts to selecting between the first and second measurement bases, respectively. In other words, Alice's 0 and $\pi$ values are compatible with Bob's 0 value (first basis), and Alice's $\pi/2$ and $3\pi/2$ values are compatible with Bob's $\pi/2$ value (second basis).

A phase difference of 0 (i.e. the phase shift applied by Alice is 0 and the phase shift applied by Bob is 0 or the phase shift applied by Alice is $\pi/2$ and the phase shift applied by Bob is $\pi/2$), leads to a detection at detector 828. If, on the other hand, there is a phase difference of $\pi$ (i.e. the phase shift applied by Alice is $\pi$ and the phase shift applied by Bob is 0 or the phase shift applied by Alice is $3\pi/2$ and the phase shift applied by Bob is $\pi/2$) there will be a detection at detector 829. For any other value of difference between the phase modulation applied at the two phase modulators, there will be a finite probability that a photon may output at detector 828 or detector 829.

Neither Alice nor Bob knows what values the other chooses or will choose when choosing their values. Only afterwards do they compare whether they used the same basis, and then only use the values for the final key where they used the same basis. The results from any measurements performed using a different basis are discarded. This process is known as sifting.

In order to form the key, the sifting process is initiated by communication of the time arrival and decoding basis between the classical communication device 811 and the classical communication device 802. Repeating this process for each detected photon, a sifted key sequence with lengths of, for example, at least a few thousands bits is formed. Then, error correction and privacy amplification processes are used to distil a perfectly secret key between the particular transmitter and receiver pair. Error correction and privacy amplification also involve communication over the classical channel, between classical communication device 811 and classical communication device 802.

Where the classical communication device 802 comprises a classical transmitter and the classical communication device 811 comprises a classical receiver, the classical transmitter 802 transmits a classical signal into waveguide 804. The signal is inputted into the spatial multiplexing unit 805. The spatial multiplexing unit 805 directs the signal into the fibre link 806, in a second spatial channel. The classical signal is transmitted along the second spatial channel in the fibre link 806, and is directed by the spatial multiplexing unit 807 into optical waveguide 809. The signal is then received by the classical receiver 811.

Where the classical communication device 811 comprises a classical transmitter and the classical communication device 802 comprises a classical receiver, the classical transmitter 811 transmits a classical signal into optical waveguide 809. The signal is inputted into the spatial multiplexing unit 807. The spatial multiplexing unit 807 directs the signal into the fibre link 806, in a second spatial channel. The classical signal is transmitted along the second spatial channel in the fibre link 806, and is directed by the spatial multiplexing unit 805 into optical waveguide 804. The signal is received by the classical receiver 802.

The system of FIG. 8 is an example of how to implement a QKD network using the BB84 protocol. Other quantum communication protocols and optical setups can also be implemented using configurations such as shown in FIGS. 1A and B, for example, coherent-one-way protocol or differential phase shift protocol. Two-way QKD systems (where laser pulses are launched by Bob, modulated and attenuated at Alice and then sent back to Bob where they are detected) can also be implemented using configurations such as shown in FIGS. 1A and B.

A plurality of quantum transmitters, quantum receivers and classical communication devices may be connected by the waveguide 806 and spatial multiplexing units 805 and 807. However, for simplicity, only one quantum transmitter, one quantum receiver and two classical communication devices are shown in the drawing.

The system may operate at a single clock frequency. A synchronisation channel is realised through the classical channel, i.e. optical waveguide 809, spatial multiplexing unit 807, a second spatial channel in fibre link 806, spatial multiplexing unit 805 and optical waveguide 804. A synchronisation signal (for example a clock signal) may be sent along the synchronisation channel. Alternatively, the system clock can be generated at the quantum transmitter side from the data that is sent over the classical channel from the quantum receiver side, without sending a dedicated synchronisation signal. Alternatively, the system clock is generated at the quantum receiver side from data sent over the classical channel from the quantum transmitter side, without sending a dedicated synchronisation signal.

In an embodiment, a timing control module in the receiver provides a master clock signal to which the quantum transmitter 801 and quantum receiver 810 are synchronised. In an alternative embodiment, a timing control module in the transmitter provides a master clock signal to which the quantum transmitter 801 and quantum receiver 810 are synchronised.

Where the system comprises a plurality of quantum transmitters in communication with a common receiver, the plurality of quantum transmitters may be synchronised such that at any receiver clock period, at most one transmitter is allowed to transmit a pulse encoded with quantum information, and the receiver can identify which transmitter has transmitted the pulse which it has just received.

Where there are a plurality of quantum transmitters in communication with a common receiver, time-division multiplexing may be used to combine the signals, for example, when the multiple transmitters are physically at different locations and each transmitter generates a secret key with the receiver which is not known to the other transmitters. Alternatively, WDM may be used to multiplex quantum signals from a plurality of quantum transmitters together, for example, if multiple quantum transmitters are at the same location.

The timing control module in the receiver may provide the system master clock. The phase modulator 826 and gated detectors 829 and 828 in the quantum receiver 810 may be synchronised to the master clock. The master clock signal may also be transmitted to the classical communication device 802 and used to drive the source 838 and the phase modulator 816 in the quantum transmitter 801. The master clock may also provide time reference for photon arrivals. Alternatively, the timing control module may be in the transmitter, and the master clock signal may be transmitted to the receiver. The source 838 and the phase modulator 816 in the quantum transmitter 801 may be synchronised to the master clock. The master clock signal may also be transmitted to the classical communication device 811 and used to drive the phase modulator 826 and gated detectors 829 and 828 in the quantum receiver 810 and provide time reference for photon arrivals.

The master clock may be determined by the speed of the single photon detectors in the quantum receiver 810. For example, for self-differencing InGaAs APDs based single photon detectors, the master clock can be operated at 1 GHz or higher. The master clock does not have to be at the same frequency as the transmitter and detector, but could be lower, for example 250 MHz or 10 MHz.

A trigger signal may be generated from the master clock signal at the control unit in the transmitter unit, and used to drive the source 838. During each trigger pulse, the source 838 outputs one optical pulse. An intensity modulator may modulate the intensity of each pulse on a pulse-by-pulse basis. Alternatively, direct modulation can be realized by varying amplitude of driving signals applied to the photon source 838.

The optical pulses are then fed into the Mach-Zehnder interferometer 839. The length difference between the two arms of the Mach Zehnder interferometer 839 corresponds to an optical propagation delay of $t_{delay}$. A photon travelling through the long arm 814 will lag a photon travelling through the short arm 813 by a time of $t_{delay}$ at the exit of the interferometer 839.

A trigger signal from the control unit in the transmitter unit may also be used to control the phase modulator 816, such that a phase modulation is applied when a light pulse is present.

The quantum optical pulses are then transmitted to the quantum receiver 810. The signal pulses are fed into the interferometer 821. The polarising beam splitter 822 divides the incident pulses with orthogonal polarisations. The phase modulator 826 may also be synchronised with the arrival time of the photons, using the master clock signal.

Due to the use of polarising components, there are, in ideal cases, only two routes for a signal pulse travelling from the entrance of the encoding interferometer 811 to the exit of the decoding interferometer 821:
  i. Long Arm 814-Short Arm 824 (L-S) and
  ii. Short Arm 813-Long Arm 823 (S-L).

For initial adjustment, a variable delay line may be included in one of the interferometers, and adjusted to make the propagation time along routes (i) and (ii) almost equal, within the signal laser coherence time which may be a few picoseconds. This will ensure interference of the two paths.

The master clock signal may also be used to control the detectors, such that the detectors are gated on during the arrival of those photons that experience interference, i.e., photons travelling through the short arm of one interferometer and the long arm of the other interferometer.

Due to non-ideal polarisations, some photons travel either both short arms or both long arms, thus arriving at the detectors 828 and 829 with a time delay of $\pm t_{delay}$ respective with interfering photons. These non-interfering photons do not contribute to the key generation or key rate. Therefore, detection results of these photons should be discarded.

In order to avoid contamination of interfering photons, appropriate $t_{delay}$ may be chosen delay is to ensure that (1) $t_{delay}$ is longer than the detector time resolution and (2) $t_{delay}$ is shorter than the receiver's system clock period. In one embodiment, $t_{delay}$ is half of the system clock period. For example, for a 1 GHz receiver, $t_{delay}$ is 500 picoseconds.

During quantum communication, a number of physical parameters may be actively stabilized, including the arm length matching between asymmetric Mach-Zehnder interferometers, the photon polarisation, and the photon arrival times.

Active stabilisation can be realised by a feedback control unit at the quantum receiver, configured to generate a feedback signal. This feedback signal is then transmitted by the classical communication device 811 to the classical communication device 802. A control unit (not shown) in the quantum transmitter 801 then controls a component or components of the quantum transmitter based on the feedback signal.

Alternatively, active stabilisation can be realised by a control unit at the quantum receiver, which does not generate a feedback signal. The control unit (not shown) in the quantum receiver then controls a component or components of the quantum receiver based on the stabilisation pulse counts for example. The timing of the detectors, the phase modulator, the phase of the interferometer and the polarisation is adjusted by the control unit based on, for example, the stabilisation pulse counts. No feedback signal needs to be transmitted.

Active stabilisation of the arm length, i.e. arm length matching can be realised through actively adjusting a tuneable phase delay in the transmitter interferometer 839 based on a feedback signal transmitted through the classical channel from the classical communication device 811. The feedback signal can be the quantum bit error ratio (QBER). This can be minimised by tuning the tuneable phase delay. In other words, the control unit adjusts the tuneable phase delay each time the QBER feedback signal is received, in order to minimise the QBER. The QBER is available to send to the transmitter only after each error correction process. The latency in determining the QBER allows compensation of only slow variation of arm lengths.

In an alternative embodiment, it is possible to achieve faster compensation, by sending strong reference pulses through the quantum channel from the transmitter, substituting a small fraction of signal/decoy pulses. These reference pulses are not modulated in phase, and therefore the degree of interference of the reference pulses will indicate the status of the arm length matching. Detection results of the reference pulses can be transmitted to the transmitter through the classical channel by to be used as a feedback to adjust the tuneable phase delay.

The tuneable phase delay acts as a control element. It may be a fibre stretcher, driven by a piezo-electric actuator.

Alternatively, the two delays can be balanced by carefully controlling the length of fibre in the two interferometers. Fine adjustment of the phase length of the two optical paths can be achieved through either tuning the DC bias in the phase modulator in the transmitter, or adding an AC offset to the driving signal applied to the phase modulator.

Alternatively, arm length matching can be realised by adjustment of components in the receiver, for example a tuneable phase delay, or the phase modulator, based on the QBER or detection results of reference pulses. In this case, a feedback signal does not need to be sent.

In one embodiment, the polarisation drift can be actively stabilized using the polarisation controller 818. Ideally, all photons passing through the encoder and decoder experience the interference at the beam splitter 827 and contribute to the key formation. However, polarisation drift in the fibres 803, 806 and 808 will cause photons be routed to the non-interfering paths, such as photons passing through either both long arms or short arms of the two interferometers. These non-interfering photons do not contribute to the key formation. They are automatically rejected in the case with gated photon detectors, or can be rejected using a timing discrimination window in the detector subsystem with free-running single photon detectors. In either case, polarisation drift reduces the photon count rate of interfering photons. By optimising this count rate by adjusting the polarisation controller this drift can be corrected for. In other words, the count rate is transmitted from the classical communication device 811 to the classical communication device 802. The control unit then adjusts the polarisation controller 818 in order to maximise the count rate.

Alternatively, where the polarisation controller is in the receiver, it can be adjusted based on the count rate without a feedback signal being sent.

The photon arrival time at the detectors 829 and 828 can also be corrected for by tuning the trigger time of the photon source 838 based on the photon detection results. Alternatively, the gating of the detectors can be adjusted based on the photon detection results, without a feedback signal being sent.

Figure 9:
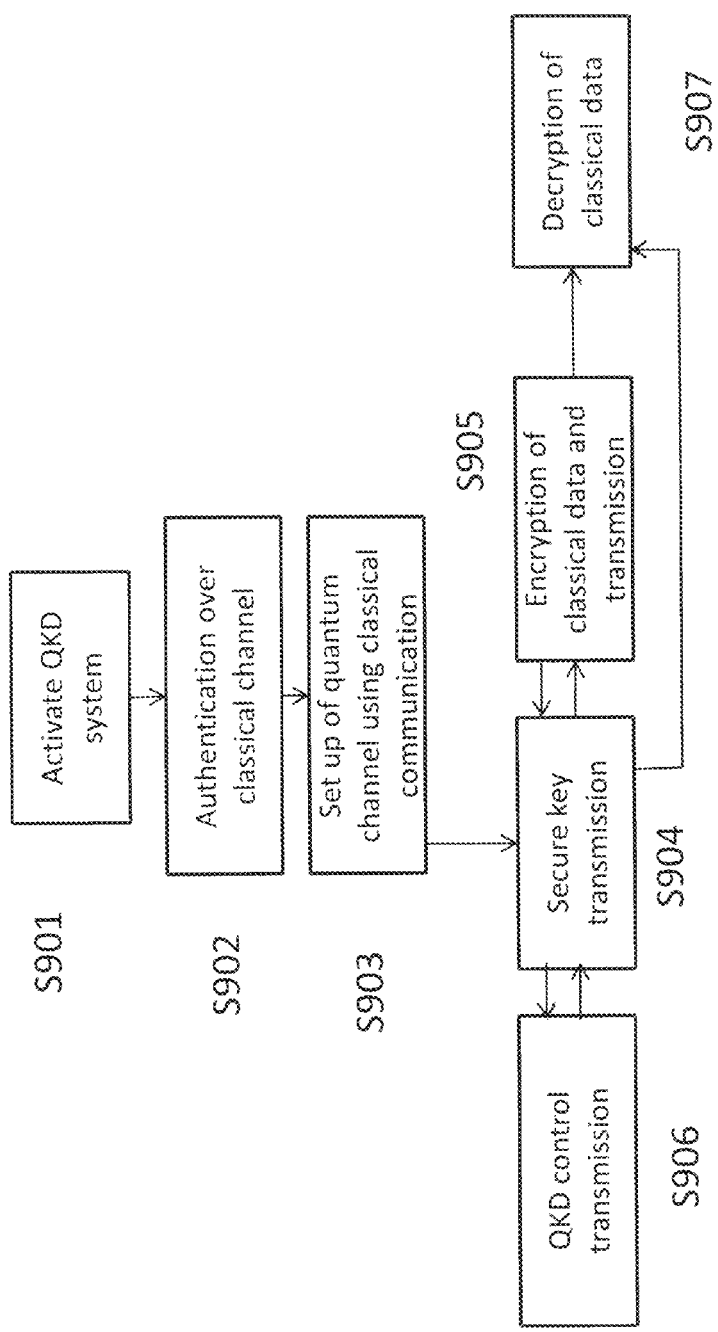
FIG. 9 is a flow diagram illustrating how quantum keys can be used to encrypt classical data signals.

FIG. 9 is a flow diagram illustrating how quantum keys can be used to encrypt classical data signals.

In a QKD system, synchronisation and classical data signals may be transmitted continuously, along with quantum signals generating keys.

In step S901 the QKD system is activated.

In step S902, the quantum link is activated by performing authentication between the quantum transmitter and quantum receiver over the classical channel.

To perform authentication of the QKD link, encryption keys may be pre-stored in the transmitter and receiver. This key is used to start up the QKD link securely.

Alternatively, a public-key encryption method such as RSA can be used. In one embodiment, RSA is used if the time it takes for an attacker to decrypt the data exchanged initially is longer than it takes to establish the QKD link and exchange the first secure key. Once the first keys are exchanged, these keys are used for authentication and the QKD link is secure, even if the attacker decrypts the first data at a later time.

Alternatively, a trusted courier is used to establish the initial secret key. Instead of having a pre-stored key, a person physically transports a key from Alice to Bob, or vice versa, in order to start up the QKD link.

Authentication is performed over the classical channel. Authentication enables Alice and Bob to be sure that they are communicating with each other, and not with someone else. This prevents Eve from impersonating either Alice or Bob, thus making QKD insecure. At the first startup, a pre-stored key may be used for authentication until the QKD link has generated enough keys. For example, the manufacturer of Alice and Bob's devices may store a key of a certain length in both devices, which is used for the initial authentication. As only Alice and Bob know this secret key, they can use it to confirm that they are communicating with each other. Authentication may be performed by using hash functions in combination with the secret key for example.

Authentication can be performed for every data packet that is exchanged. In other words, authentication can be performed continuously using a small fraction of the generated secure keys.

If authentication is successful, in step S903, the receiver and transmitter perform an automatic start-up procedure to set up the quantum channel. The quantum receiver and quantum transmitter need to be aligned in time, and the phase and polarisation have to be set correctly. This is achieved by communication over the classical channel. If Bob and Alice wish to encrypt this information, it may also be encrypted using the pre-stored key, as discussed above.

After alignment is achieved, QKD runs continuously in parallel to any classical communication. Step S904 (secure key transmission) step S905 (encrypting of classical data and transmission) step S907 (decryption of classical data) and step S906 (QKD control transmissions, i.e. transmission of QKD control signals including feedback control, synchronisation, secure key sifting, error correction and privacy amplification) may all run continuously in parallel. The keys generated in S904 are stored in a memory and are used for classical communication. If either Alice or Bob want to send some data, they take some of the key, encrypt and transmit the data in step S905, and the receiver decrypts it using the same key in step S907.

Step S904, secure key transmission, corresponds to quantum signals being sent from the quantum transmitter to the quantum receiver, in order to form a key. The key may be formed using the BB84 protocol described above, or an alternative protocol.

The encryption keys generated in S904 are used to encrypt classical data in S905. The encryption keys may also be used to encrypt the transmission of QKD control signals in step S906.

In one embodiment, classical data is encrypted with one-time-pad encryption. The data is encrypted with a key of the same length as the data. If the encryption key is not re-used at a later time and stays secret, the encryption is unconditionally secure and can never be decrypted by an eavesdropper. In a further embodiment encryption keys shorter than the length of the data are used. The encryption might be based on the advanced encryption standard (AES).

The keys can be used for subsequent cryptographic tasks such as the authentication and encryption of classical data sent between Alice and Bob.

When the QKD link is operational, further keys are generated as required. These keys are used for the operation of the QKD system and any data that needs to be sent encrypted. In one embodiment, only important data is encrypted, e.g. email communication, whereas other communications such as website information or videos would not be encrypted.

The classical data is transmitted in step S905. This corresponds to classical signals being sent from the Alice to Bob and/or from Bob to Alice.

The classical data is then decrypted in step S907.

The encryption and decryption of the classical data can run in parallel. While the recipient decrypts one message, at the same time the sender can encrypt the next one. The secure key is also used for decrypting.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made without departing from the spirit of the inventions. The accompanying claims and their equivalents are intended to cover such forms of modifications as would fall within the scope and spirit of the inventions.

The invention claimed is:

1. A quantum communication system, comprising:
   a quantum transmitter optically coupled to a first waveguide;
   a first communication device, optically coupled to a second waveguide;
   a multi-core optical fibre comprising a first core and a second core;
   a spatial multiplexing unit, configured to optically couple the first waveguide to the first core and the second waveguide to the second core such that the first waveguide and the second waveguide are optically coupled to different cores.

2. A quantum communication system according to claim 1, wherein the multi-core optical fibre comprises at least 4 cores.

3. A quantum communication system according to claim 1, wherein the spatial multiplexing unit comprises a fibre fan-out.

4. A quantum communication system according to claim 1, wherein at least one of the first core or the second core is configured to transmit a plurality of signals using wavelength division multiplexing.

5. A quantum communication system according to claim 4, further comprising a wavelength division multiplexer.

6. A quantum communication system according to claim 1, wherein at least one of the first core and the second core is a multi-mode waveguide.

7. A quantum communication system according to claim 6, further comprising a spatial mode de-multiplexer.

8. A quantum communication system according to claim 1, wherein the quantum transmitter comprises a pulsed laser and an optical attenuator.

9. A quantum communication system according to claim 1, wherein the first communication device is a classical communication device.

10. A quantum communication system according to claim 9, further comprising:
    one or more further classical communication devices, each optically coupled to a further waveguide;
    wherein the multi-core optical fibre comprises one or more further cores and wherein the spatial multiplexing unit is further configured to optically couple each waveguide to a different core in the multi-core optical fibre.

11. A quantum communication system according to claim 1, wherein the first communication device is a quantum communication device.

12. A quantum communication system according to claim 11, further comprising:
    one or more further quantum communication devices, each optically coupled to a further waveguide;
    wherein the multi-core optical fibre comprises one or more further cores and wherein the spatial multiplexing unit is further configured to optically couple each waveguide to a different core in the multi-core optical fibre.

13. A quantum communication system according to claim 1, further comprising:
    a quantum receiver, comprising at least one detector configured to detect quantum signals, and optically coupled to a third waveguide;
    a second communication device optically coupled to a fourth waveguide;
    a second spatial multiplexing unit, configured to optically couple the third waveguide to the first core in the multi-core optical fibre and the fourth waveguide to the second core in the multi-core optical fibre.

14. The quantum communication system according to claim 13, further comprising:
    a timing controller, configured to provide a synchronisation signal for synchronising the quantum transmitter and quantum receiver, wherein the second communication device is configured to receive the synchronisation signal from the timing controller and send the synchronisation signal to the first communication device through the second core in the multi-core fibre.

15. The quantum communication system according to claim 13, further comprising:
    a timing controller, configured to provide a synchronisation signal for synchronising the quantum transmitter and quantum receiver, wherein the first communication device is configured to receive the synchronisation signal from the timing controller and send the synchronisation signal to the second communication device through the second core in the multi-core optical fibre.

16. A quantum communication system according to claim 14, wherein the at least one detector is a gated detector and the timing controller is configured to provide the synchronisation signal to the detector to synchronise the gating of the detector with the arrival time of signals from the quantum transmitter.

17. The quantum communication system according to claim 13, wherein the quantum receiver comprises a decoder and the quantum transmitter comprises an encoder, configured to generate an encryption key between the quantum receiver and the quantum transmitter.

18. The quantum communication system of claim 17, comprising an encryption module configured to encrypt classical data using the generated encryption key and a decryption module configured to decrypt classical encrypted data using the generated encryption key, and wherein the first communication device and second communication device are configured to exchange encrypted classical data.

19. A quantum communication system, comprising:
- a receiver, comprising at least one detector configured to detect quantum signals, and optically coupled to a first waveguide;
- a second communication device optically coupled to a second waveguide;
- a multi-core optical fibre comprising a first core and a second core;
- a spatial multiplexing unit, configured to optically couple the first waveguide to the first core and the second waveguide to the second core such that the first waveguide and the second waveguide are optically coupled to different cores.

20. A quantum communication method for communicating over a system comprising a quantum transmitter, a first communication device, a first spatial multiplexing unit, a multi-core optical fibre comprising a comprising a first core and a second core, a second spatial multiplexing unit, a quantum receiver and a second communication device, the method comprising the steps of:
- sending quantum signals from the quantum transmitter to the first spatial multiplexing unit;
- directing the quantum signals into the first core in the multi-core optical fibre;
- receiving the quantum signals from the first core at the second spatial multiplexing unit;
- directing the quantum signals to the quantum receiver;
- sending signals from one of the first communication device or the second communication device to one of the first spatial multiplexing unit or the second spatial multiplexing unit;
- directing the signals into the second core in the multi-core optical fibre, such that the quantum signal and the signal from one of the first communication device or the second communication device are launched into different cores;
- receiving the signals from the second core at the other of the first spatial multiplexing unit or the second spatial multiplexing unit;
- directing the signals to the other one of the first communication device or the second communication device.

* * * * *